US009571717B2

(12) United States Patent
Ichikawa et al.

(10) Patent No.: US 9,571,717 B2
(45) Date of Patent: Feb. 14, 2017

(54) IMAGING DEVICE, IMAGING SYSTEM, IMAGING METHOD, AND COMPUTER-READABLE RECORDING MEDIUM

(71) Applicant: Olympus Corporation, Hachioji-shi, Tokyo (JP)

(72) Inventors: Manabu Ichikawa, Hachioji (JP); Katsuhisa Kawaguchi, Atsugi (JP); Masaomi Tomizawa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/688,532

(22) Filed: Apr. 16, 2015

(65) Prior Publication Data
US 2015/0229828 A1   Aug. 13, 2015

Related U.S. Application Data

(63) Continuation of application No. PCT/JP2014/066178, filed on Jun. 18, 2014.

(30) Foreign Application Priority Data

Oct. 11, 2013 (JP) .................................. 2013-214092

(51) Int. Cl.
H04N 5/225 (2006.01)
H04N 5/232 (2006.01)
(Continued)

(52) U.S. Cl.
CPC .......... *H04N 5/23206* (2013.01); *G03B 15/00* (2013.01); *G06F 3/04842* (2013.01);
(Continued)

(58) Field of Classification Search
CPC ..................... H04N 5/23206; H04N 21/42222;
H04N 5/4403; H04N 5/232; H04N 5/225; H04N 2005/4428; G06F 3/04842; G06F 3/048; G06F 2203/04803; G03B 15/00; G03B 17/18
(Continued)

(56) References Cited

U.S. PATENT DOCUMENTS

2012/0069210 A1   3/2012 Miyata
2012/0307080 A1   12/2012 Yumiki
2013/0100306 A1*  4/2013 Bekiares .......... G08B 13/19689
                                                       348/211.99

FOREIGN PATENT DOCUMENTS

JP   2004-080359   3/2004
JP   2006-014119   1/2006
(Continued)

OTHER PUBLICATIONS

International Search Report to International Application No. PCT/JP2014/066178, mailed on Aug. 12, 2014 (4 pgs.).
(Continued)

*Primary Examiner* — Yogesh Aggarwal
(74) *Attorney, Agent, or Firm* — John C. Pokotylo; Straub & Pokotylo

(57) ABSTRACT

An imaging device includes: an imaging unit that generates image data; a first communication unit; a first communication control unit that transmits the image data to an external communication device and receives recording information for causing the imaging device to record a subject image included in the image data from the communication device; and a specification information generation unit that generates specification information for specifying the subject image based on the recording information and records the specification information in a recording unit. The recording information includes subject image information. The specification information generation unit records the specification
(Continued)

information including the subject image information in the recording unit.

15 Claims, 14 Drawing Sheets

(51) Int. Cl.
*G03B 15/00* (2006.01)
*H04N 5/44* (2011.01)
*H04N 21/422* (2011.01)
*G06F 3/0484* (2013.01)

(52) U.S. Cl.
CPC ....... *H04N 5/23293* (2013.01); *H04N 5/4403* (2013.01); *H04N 21/42222* (2013.01); *G03B 2206/00* (2013.01); *G06F 2203/04803* (2013.01); *H04N 2005/4428* (2013.01)

(58) Field of Classification Search
USPC ....... 348/207.1, 207.11, 211.99, 211.1–211.9
See application file for complete search history.

(56) References Cited

FOREIGN PATENT DOCUMENTS

| | | |
|---|---|---|
| JP | 2006-253806 | 9/2006 |
| JP | 2010-130190 | 6/2010 |
| JP | 2011-024139 | 2/2011 |
| JP | 2012-222603 | 11/2012 |
| JP | 2013-013062 | 1/2013 |
| JP | 2013-110738 | 6/2013 |

OTHER PUBLICATIONS

Written Opinion to International Patent Application No. PCT/JP2014/066178, mailed on Aug. 12, 2014 (4 pgs.).

Office Action to Japanese Patent Application No. 2015-500706, mailed on Dec. 15, 2015 (2 pgs) with translation (4 pgs).

Japanese Office Action to Japanese Patent Application No. 2015-500706, mailed on May 10, 2016 (2 pgs) with translation (4 pgs.).

Decision of a Patent Grant to corresponding Japanese Patent Application No. 2015-500706, mailed on Nov. 15, 2016 (1 pg.), with translation (2 pgs.).

\* cited by examiner

FIG.1
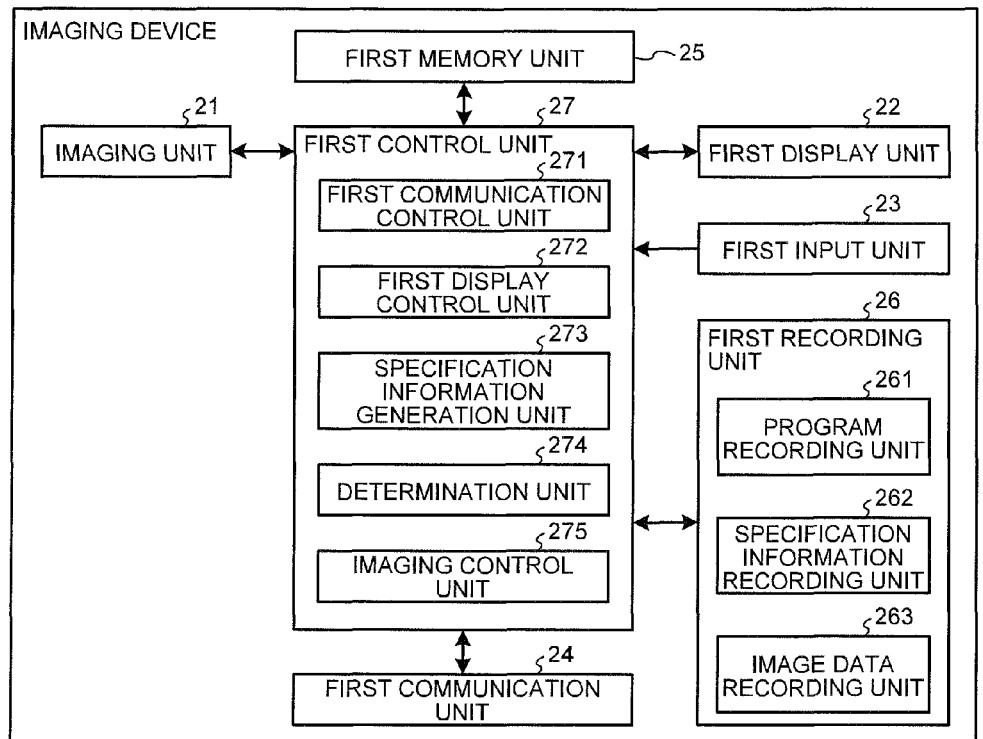
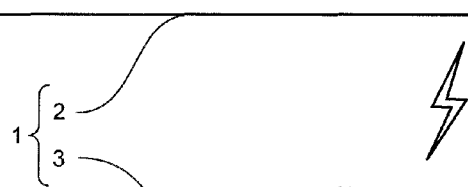
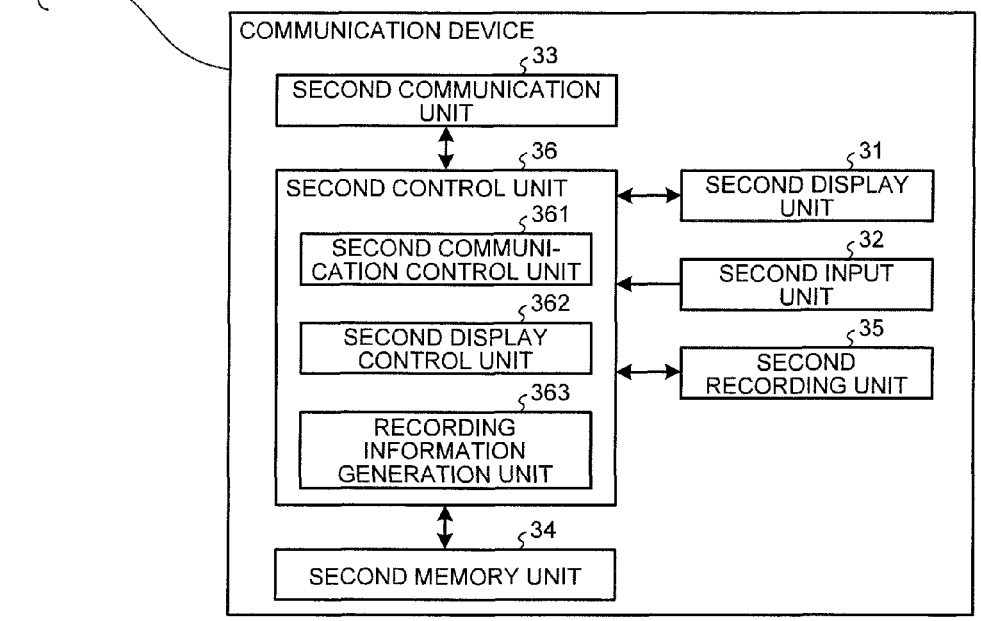

VIEW OF LOCATION WHERE USER OF IMAGING DEVICE IS PRESENT

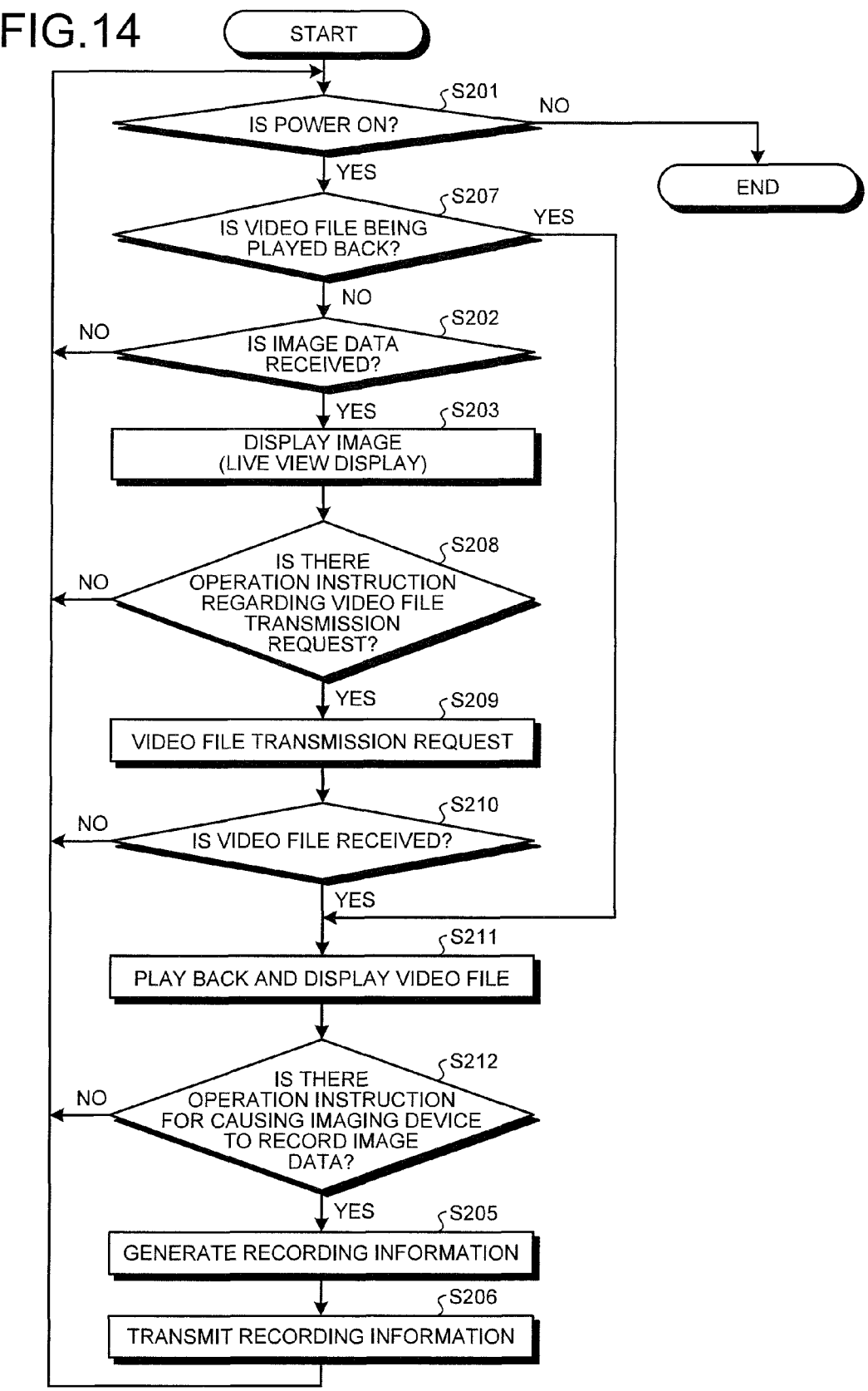

IMAGING DEVICE, IMAGING SYSTEM, IMAGING METHOD, AND COMPUTER-READABLE RECORDING MEDIUM

CROSS REFERENCES TO RELATED APPLICATIONS

This application is a continuation of PCT international application Ser. No. PCT/JP2014/066178 filed on Jun. 18, 2014 which designates the United States, incorporated herein by reference, and which claims the benefit of priority from Japanese Patent Application No. 2013-214092, filed on Oct. 11, 2013, incorporated herein by reference.

BACKGROUND

1. Technical Field

The present invention relates to an imaging device for imaging a subject, an imaging system including the imaging device, an imaging method to be performed by the imaging device, and a computer-readable recording medium.

2. Related Art

In recent years, there is known a technique of causing an imaging device such as a digital camera or a digital video camera to display, on a display unit, a live view image corresponding to image date generated by imaging, and to sequentially transmit the image data to an external communication device such as a mobile phone by using communication technology (see Japanese Patent Application Laid-open No. 2006-14119).

The technique is a technique for a user of a communication device to issue an operation instruction (an operation instruction for changing the field of view with the aim of imaging a specific subject, and the like) to a user of an imaging device by using communication technology.

Specifically, according to the technique, the communication device sequentially receives pieces of image data transmitted from the imaging device, and sequentially displays live view images corresponding to the pieces of image data on the display unit. The user of the communication device checks the live view image displayed on the display unit of the communication device, and performs a predetermined operation on the communication device when he/she wants to shoot a specific subject after changing the field of view to be imaged by the imaging device, for example. An operation instruction is transmitted from the communication device to the imaging device by the operation mentioned above. After receiving the operation instruction, the imaging device displays, on the display unit, information according to the operation instruction (for example, an arrow indicating the direction of change of the field of view or the like). Then, the user of the imaging device checks the information displayed on the display unit of the imaging device, and determines whether or not to perform a shooting operation according to the information.

SUMMARY

In accordance with some embodiments, an imaging device, an imaging system, an imaging method, and a computer-readable recording medium are presented.

In some embodiments, an imaging device that images a subject is presented. The imaging device includes: an imaging unit that images the subject to generate image data; a first communication unit that connects to an external communication device to transmit and receive information to and from the communication device; a first communication control unit that transmits the image data to the communication device and receives recording information for causing the imaging device to record a subject image included in the image data from the communication device, via the first communication unit; and a specification information generation unit that generates specification information for specifying the subject image based on the recording information received via the first communication unit and records the specification information in a recording unit. The recording information includes subject image information related to an image including the subject image. The specification information generation unit records the specification information including the subject image information in the recording unit.

In some embodiments, an imaging system includes: the imaging device; and the communication device that connects to the imaging device to transmit and receive information to and from the imaging device. The communication device includes: a second communication unit that connects to the imaging device to transmit and receive information to and from the imaging device; a second communication control unit that receives the image data from the imaging device via the second communication unit; a second display unit; a second display control unit that causes the second display unit to display an image corresponding to the image data received via the second communication unit; an instruction receiving unit that receives an operation instruction; and an recording information generation unit that generates the recording information for causing the imaging device to record the subject image included in the image data based on the operation instruction received by the instruction receiving unit. The second communication control unit transmits the recording information to the imaging device.

In some embodiments, an imaging method executed by an imaging device is presented. The imaging method includes: imaging a subject to generate image data; transmitting the image data to an external communication device; and when recording information for causing the imaging device to record a subject image included in the image data is received from the communication device, generating specification information for specifying the subject image based on the recording information and recording the specification information in a recording unit. The recording information includes subject image information related to an image including the subject image. In the generating and the recording, the specification information including the subject image information is recorded in the recording unit.

In some embodiments, a non-transitory computer readable recording medium having an executable program recorded thereon is presented. The program instructs a processor included in an imaging device, to execute: imaging a subject to generate image data; transmitting the image data to an external communication device; and when recording information for causing the imaging device to record a subject image included in the image data is received from the communication device, generating specification information for specifying the subject image based on the recording information and recording the specification information in a recording unit. The recording information includes subject image information related to an image including the subject image. In the generating and the recording, the specification information including the subject image information is recorded in the recording unit.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a configuration of an imaging system according to a first embodiment of the present invention;

FIG. 14 is a flow chart illustrating an operation of the communication device illustrated in FIG. 12.

DETAILED DESCRIPTION

Figure 2:
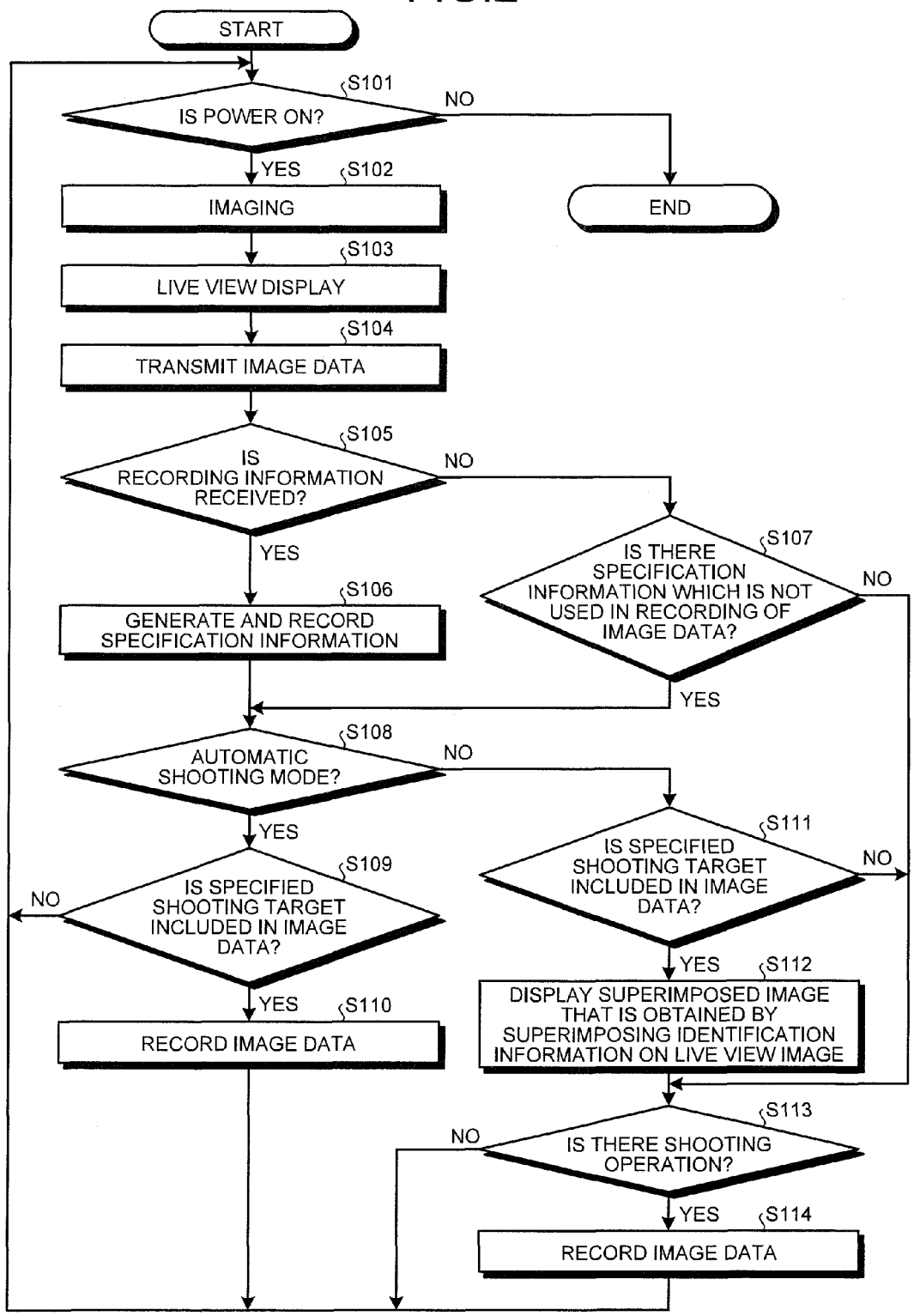
FIG. 2 is a flow chart illustrating an operation of an imaging device illustrated in FIG. 1.

Hereinafter, modes of carrying out the present invention (hereinafter referred to as "embodiment(s)") will be described with reference to the drawings. Additionally, the present invention is not to be limited by the embodiments described below. Moreover, in the drawings, the same portions are denoted by the same reference signs.

First Embodiment

Schematic Configuration of Imaging System

FIG. 1 is a block diagram illustrating a configuration of an imaging system 1 according to a first embodiment of the present invention.

The imaging system 1 includes an imaging device 2 (FIG. 1) and a communication device 3 (FIG. 1) that are operated by different users, and that are connected in a manner capable of exchanging information with each other by wireless communication.

Additionally, the imaging system 1 may be configured to connect the imaging device 2 and the communication device 3 in a manner capable of exchanging information by wired communication, without being limited to wireless communication.

Moreover, the imaging system 1 is a system according to which, when the user of the communication device 3 issues, to the communication device 3, an operation instruction for causing the imaging device 2 to shoot a specific subject, the imaging device 2 at a location away from the user of the communication device 3 is caused to perform automatic shooting of the subject, or the imaging device 2 performs predetermined display and urges the user of the imaging device 2 to perform a shooting operation for the subject.

Configuration of Imaging Device

The imaging device 2 is a device for imaging an object, and is configured as an electronic appliance such as a digital camera, a digital video camera, a mobile phone with a shooting function or a tablet mobile appliance, an endoscope, or a microscope, for example.

Additionally, in the following, the main portions of the present invention will be mainly described as the structural elements of the imaging device 2.

As illustrated in FIG. 1, the imaging device 2 includes an imaging unit 21, a first display unit 22, a first input unit 23, a first communication unit 24, a first memory unit 25, a first recording unit 26, a first control unit 27, and the like.

The imaging unit 21 images an object and generates image data under the control of the first control unit 27. This imaging unit 21 is configured by an image sensor such as a CCD (Charge Coupled Device) for converting received light into an electrical signal, a signal processing unit for generating digital image data by performing signal processing (A/D conversion or the like) on the electrical signal (an analog signal) from the image sensor, and the like.

Then, the image data generated by the imaging unit 21 is sequentially stored in the first memory unit 25 under the control of the first control unit 27, and is recorded in the first recording unit 26 according to a shooting operation on the first input unit 23 by the user of the imaging device 2. Also, in the case where the imaging device 2 is set to an automatic shooting mode, image data including a specific subject image desired by the user of the communication device 3, among pieces of image data generated by the imaging unit 21, is recorded in the first recording unit 26 under the control of the first control unit 27.

Additionally, in the following, a specific subject image desired by the user of the communication device 3 will be expressed as a "specified shooting target".

Now, the imaging device 2 is set to an automatic shooting mode or a manual shooting mode according to an operation by the user of the imaging device 2 on the first input unit 23. Also, setting information indicating which of the automatic shooting mode and the manual shooting mode is set is stored in the first memory unit 25.

The automatic shooting mode is a mode of automatically recording, in the first recording unit 26, image data including a specified shooting target, among pieces of image data generated by the imaging unit 21, without the operation by the user of the imaging device 2 on the first input unit 23.

The manual shooting mode is a mode of recording image data generated by the imaging unit 21 in the first recording unit 26 according to a shooting operation by the user of the imaging device 2 on the first input unit 23.

The first display unit 22 is configured by using a display panel such as a liquid crystal panel or an organic EL (Electro Luminescence) panel.

For example, the first display unit 22 sequentially displays (live-view displays), under the control of the first control unit 27, live view images corresponding to pieces of image data (hereinafter referred tows "live view image data") that are successively generated by the imaging unit 21 and that are sequentially stored in the first memory unit 25. Also, if a specified shooting target is included in a live view image, the first display unit 22 displays a superimposed image obtained by superimposing, on the live view image, identification information for identifying the specified shooting target, under the control of the first control unit 27.

The first input unit 23 is configured by using buttons, switches and the like for receiving user operations, and outputs an instruction signal according to a user operation to the first control unit 27.

The first communication unit 24 performs, under the control of the first control unit 27, wireless communication, with the communication device 3, of various types of data including live view image data and signals necessary for communication, according to a predetermined protocol.

The first memory unit 25 stores image data generated by the imaging unit 21, recording information received from the communication device 3 via the first communication unit 24, setting information regarding the automatic shooting mode or the manual shooting mode, and the like.

The first recording unit 26 has a function as a recording unit according to the present invention, and includes a program recording unit 261, a specification information recording unit 262, an image data recording unit 263, and the like, as illustrated in FIG. 1.

The program recording unit 261 records various programs (including an imaging program) to be executed by the first control unit 27, various types of data that are used during execution of the programs, and the like.

The specification information recording unit 262 records specification information generated by the first control unit 27, under the control of the first control unit 27.

The image data recording unit 263 records image data generated by the imaging unit 21, under the control of the first control unit 27.

The first control unit 27 is configured by using a CPU (Central Processing Unit) and the like, and controls the operation of the imaging device 2 in an overall manner by, for example, issuing an instruction or performing transfer of data to a corresponding unit configuring the imaging device 2 according to an instruction signal from the first input unit 23, recording information received via the first communication unit 24, or the like.

As illustrated in FIG. 1, the first control unit 27 includes a first communication control unit 271, a first display control unit 272, a specification information generation unit 273, a determination unit 274, an imaging control unit 275, and the like.

The first communication control unit 271 controls the operation of the first communication unit 24, and performs wireless communication with the communication device 3.

For example, the first communication control unit 271 sequentially transmits pieces of live view image data which have been successively generated by the imaging unit 21 and sequentially stored in the first memory unit 25 to the communication device 3 via the first communication unit 24, and also, receives recording information from the communication device 3.

The first display control unit 272 controls the operation of the first display unit 22, and causes the first display unit 22 to display an image.

For example, the first display control unit 272 reads live view image data stored in the first memory unit 25, and causes the first display unit 22 to perform live view display. Also, the first display control unit 272 reads image data recorded in the image data recording unit 263, and causes the first display unit 22 to display an image corresponding to the image data. Moreover, in the case where a specified shooting target is included in a live view image, the first display control unit 272 causes the first display unit 22 to display a superimposed image that is obtained by superimposing identification information for identifying the specified shooting target on the live view image.

The first display unit 22 and the first display control unit 272 described above function as a notification unit according to the present invention.

The specification information generation unit 273 generates specification information for specifying a specified shooting target based on the recording information transmitted from the communication device 3 and received via the first communication unit 24 and records the specification information in the specification information recording unit 262.

The determination unit 274 sequentially determines whether the specified shooting target is included in the latest live view image data that is stored in the first memory unit 25, based on the specification information recorded in the specification information recording unit 262.

The latest live view image data here is the same image data as that of the live view image that is currently displayed by the first display unit 22.

The imaging control unit 275 records the latest live view image data that is stored in the first memory unit 25 in the image data recording unit 263 in a certain case.

A certain case here is a case where an instruction signal is input from the first input unit 23 (a case where a shooting operation is performed by the user of the imaging device 2 on the first input unit 23), or a case where the determination unit 274 has determined that a specified shooting target is included in the latest live view image data in a state where the imaging device 2 is set to the automatic shooting mode.

Configuration of Communication Device

The communication device 3 is an appliance for performing wireless communication with the imaging device 2, and is configured as a digital camera, a digital video camera, a mobile phone or a tablet mobile appliance, for example.

Additionally, in the following, the main portions of the present invention will be mainly described as the structural elements of the communication device 3.

As illustrated in FIG. 1, the communication device 3 includes a second display unit 31, a second input unit 32, a second communication unit 33, a second memory unit 34, a second recording unit 35, a second control unit 36, and the like.

The second display unit 31 is configured by using a display panel such as a liquid crystal panel or an organic EL panel, and displays various images under the control of the second control unit 36.

The second input unit 32 is configured by using buttons, switches, a touch panel, a microphone, and the like.

That is, the second input unit (button, switch) 32 receives a user operation of the user of the communication device 3, and outputs an instruction signal according to the user operation to the second control unit 36. Also, the second input unit (touch panel) 32 detects a touch by an object from outside and outputs a position signal according to the detected touch position to the second control unit 36. Moreover, the second input unit (microphone or the like) 32 generates audio data by inputting, and converting into an electrical signal, a word (speech) uttered by the user of the communication device 3 and by performing, by applying sampling and quantization, A/D conversion on the electrical signal which has been converted, and outputs the audio data to the second control unit 36.

Moreover, the second input unit 32 has a function as an instruction receiving unit according to the present invention.

The second communication unit 33 performs, under the control of the second control unit 36, wireless communication, with the imaging device 2, of various types of data including live view image data and signals necessary for communication, according to a predetermined protocol.

The second memory unit 34 stores live view image data transmitted from the imaging device 2 and received via the second communication unit 33, for example.

The second recording unit 35 records various programs to be executed by the second control unit 36, various types of data that are used during execution of the programs, and the like.

The second control unit 36 is configured by using a CPU and the like, and controls the operation of the communication device 3 in an overall manner by, for example, issuing an instruction or performing transfer of data to a corresponding unit configuring the communication device 3 according to an instruction signal, a position signal, audio data or the like from the second input unit 32.

A second communication control unit 361 controls the operation of the second communication unit 33, and performs wireless communication with the imaging device 2.

For example, the second communication control unit 361 sequentially receives live view image data from the imaging device 2 via the second communication unit 33, and also, transmits, to the imaging device 2, recording information generated by a recording information generation unit 363.

A second display control unit 362 causes the second display unit 31 to display various images (for example, a live view image corresponding to the live view image data received by the second communication unit 33).

The recording information generation unit 363 generates recording information for causing the imaging device 2 to shoot a specific subject (for causing the imaging device 2 to record a subject image (a specified shooting target) included in live view image data), based on an instruction signal, a position information, or audio data from the second input unit 32.

Operation of Imaging System

Next, the operation of the imaging system 1 described above will be described.

In the following, as the operation of the imaging system 1, the operation of the imaging device 2 (an imaging method according to the present invention), and the operation of the communication device 3 will be described in this order.

Operation of Imaging Device

FIG. 2 is a flow chart illustrating the operation of the imaging device 2.

When the power of the imaging device 2 is turned on by an operation by the user of the imaging device 2 on the first input unit 23 (step S101: Yes), the first control unit 27 causes the imaging unit 21 to start imaging (step S102: imaging step). Then, the image data generated by the imaging unit 21 is sequentially stored in the first memory unit 25.

Next, the first display control unit 272 causes the first display unit 22 to start live view display (step S103).

Also, the first communication control unit 271 sequentially transmits, to the communication device 3, via the first communication unit 24, the latest live view image data stored in the first memory unit 25 (the same image data as that of the live view image which was displayed by the first display unit 22 in step S103) (step S104: transmission step).

Additionally, for the sake of convenience of description, in FIG. 2, step S104 is illustrated to be performed after step S103, but in reality, steps S103 and S104 are performed approximately at the same time.

Then, the first communication control unit 271 determines whether or not recording information is received from the communication device 3 via the first communication unit 24 (step S105).

If it is determined that recording information is received (step S105: Yes), the first control unit 27 stores the recording information in the first memory unit 25. Then, the specification information generation unit 273 generates, based on the recording information stored in the first memory unit 25, specification information for specifying a specified shooting target, and records the specification information in the specification information recording unit 262 (step S106: specification information generation step). Then, the imaging device 2 proceeds to step S108.

On the other hand, if it is determined that recording information is not received (step S105: No), the first control unit 27 refers to the specification information which is recorded in the specification information recording unit 262, and determines whether or not there is specification information which is not used in recording of image data (steps S110 and S114 described later) (step S107).

If it is determined that there is no specification information which is not used in recording of image data (step S107: No), the imaging device 2 proceeds to step S113.

On the other hand, if it is determined that there is specification information which is not used in recording of image data (step S107: Yes), the imaging device 2 proceeds to step S108.

After step S106, or in the case where it is determined in step S107 that there is specification information which is not used in recording of image data (step S107: Yes), the first control unit 27 refers to setting information which is stored in the first memory unit 25, and determines whether or not the imaging device 2 is set to the automatic shooting mode (step S108).

If it is determined that the imaging device 2 is set to the automatic shooting mode (step S108: Yes), the determination unit 274 determines, based on the specification information recorded in the specification information recording unit 262, whether or not the specified shooting target is included in the latest live view image data stored in the first memory unit 25 (step S109).

Here, the specification information that is to be used in step S109 includes, in addition to the latest specification information that is recorded in the specification information recording unit 262, the specification information which is determined in step S107 to not have been used in recording of image data, among pieces of specification information already recorded.

In the case where it is determined that the specified shooting target is not included in the latest live view image data (step S109: No), the imaging device 2 returns to step S101.

On the other hand, if it is determined that the specified shooting target is included in the latest live view image data (step S109: Yes), the imaging control unit 275 records the latest live view image data in the image data recording unit 263 (step S110). Then, the imaging control unit 275 records information (a flag) indicating use in recording of image data in the specification information recording unit 262 in association with the specification information used in step S109. That is, in step S107, whether or not there is specification information that is not used in recording of image data is determined by referring to the flag.

Then, the imaging device 2 returns to step S101.

If it is determined in step S108 that the imaging device 2 is set to the manual shooting mode (step S108: No), the determination unit 274 determines, based on the specification information recorded in the specification information recording unit 262, whether or not the specified shooting target is include in the latest live view image data stored in the first memory unit 25, as in step S109 (step S111).

If it is determined that the specified shooting target is not included in the latest live view image data (step S111: No), the imaging device 2 proceeds to step S113.

On the other hand, if it is determined that the specified shooting target is included in the latest live view image data (step S111: Yes), the first display control unit 272 causes the first display unit 22 to display, for a predetermined period of time, a superimposed image that is obtained by superimposing identification information for identifying the specified shooting target on the live view image corresponding to the latest live view image data (step S112).

After step S112, if it is determined in step S107 that there is no specification information that is not used in recording of image data (step S107: No), or if it is determined in step S111 that the specified shooting target is not included in the latest live view image data (step S111: No), the imaging control unit 275 determines whether or not a shooting operation is performed by the user of the imaging device 2 on the first input unit 23 (step S113).

If it is determined that there is no shooting operation (step S113: No), the imaging device 2 returns to step S101.

On the other hand, if it is determined that there is a shooting operation (step S113: Yes), the imaging control unit 275 records the latest live view image data that is stored in the first memory unit 25 in the image data recording unit 263 (step S114). Then, when determining that there is a shooting operation after display of the superimposed image in step S112 (step S113: Yes), the imaging control unit 275 records the information (flag) indicating use in recording of image data in the specification information recording unit 262 in association with the specification information used in step S111. That is, in step S107, whether or not there is specification information which is not used in recording of image data is determined by referring to the flag.

Then, the imaging device 2 returns to step S101.

Operation of Communication Device

Figure 3:
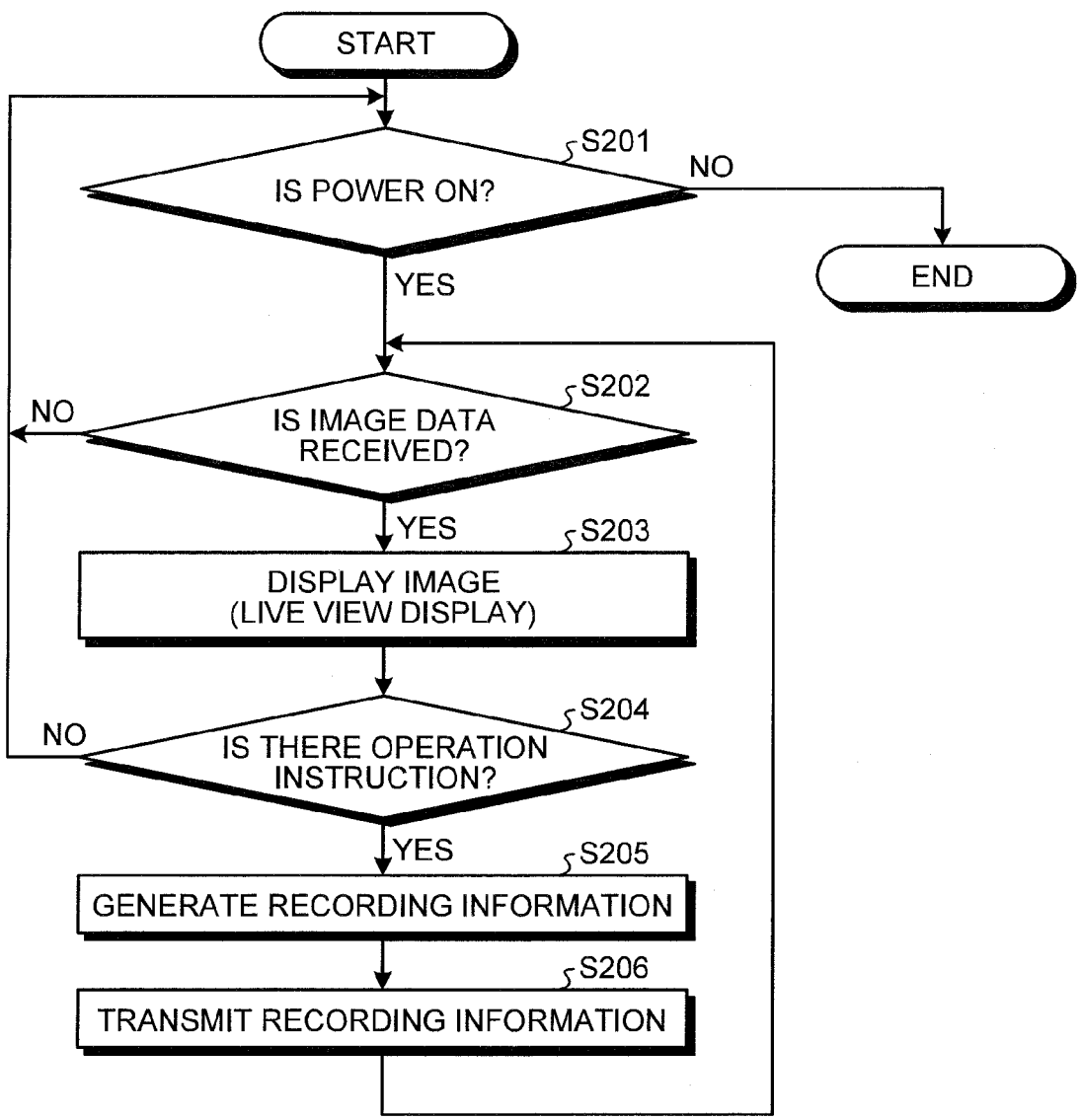
FIG. 3 is a flow chart illustrating an operation of a communication device illustrated in FIG. 1.

FIG. 3 is a flow chart illustrating the operation of the communication device 3.

When the power of the communication device 3 is turned on by an operation by the user of the communication device 3 on the second input unit 32 (step S201: Yes), the second communication control unit 361 determines whether or not live view image data has been received from the imaging device 2 via the second communication unit 33 (step S202).

In the case where it is determined that live view image data is not received (step S202: No), the communication device 3 returns to step S201.

On the other hand, in the case where it is determined that live view image data is received (step S202: Yes), the second control unit 36 sequentially stores the received live view image data in second memory unit 34. Then, the second display control unit 362 sequentially reads the live view image data stored in the second memory unit 34, and causes the second display unit 31 to display (live-view display) the live view image corresponding to the live view image data (step S203).

Subsequently, the recording information generation unit 363 determines whether or not there is an operation instruction to the imaging device 2, based on an instruction signal, a position signal, or audio data from the second input unit 32 (step S204).

If it is determined that there is no operation instruction (step S204: No), the communication device 3 returns to step S201.

On the other hand, if it is determined that there is an operation instruction (step S204: Yes), the recording information generation unit 363 generates recording information for causing the imaging device 2 to record a subject image (the specified shooting target) included in the live view image data, based on the instruction signal, the position signal, or the audio data from the second input unit 32 (step S205).

Then, the second communication control unit 361 transmits the recording information generated in step S205 to the imaging device 2 via the second communication unit 33 (step S206). Then, the communication device 3 returns to step S202.

Specific Examples of Operation Instruction and Display Mode

Specific examples of an operation instruction to be issued by the user of the communication device 3 at the time of operation of the imaging system 1 described above, and images that are displayed by the imaging device 2 and the communication device 3 will be given.

In the following, a case where the imaging device 2 is set to the "automatic shooting mode", and a case where it is set to the "manual shooting mode" will be described in this order.

Automatic Shooting Mode

Figure 4:
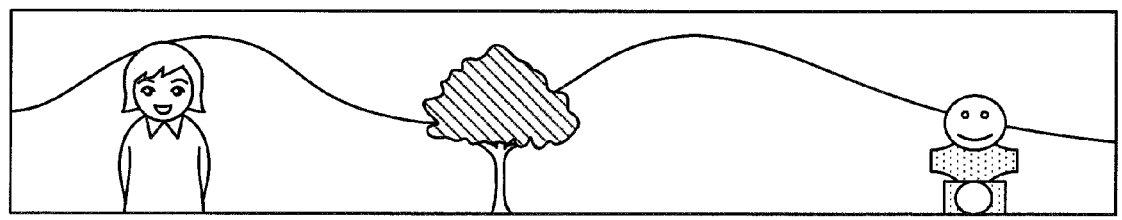
FIG. 4 is a diagram illustrating a view of the location where a user of the imaging device illustrated in FIG. 2 is present.
Figure 5:
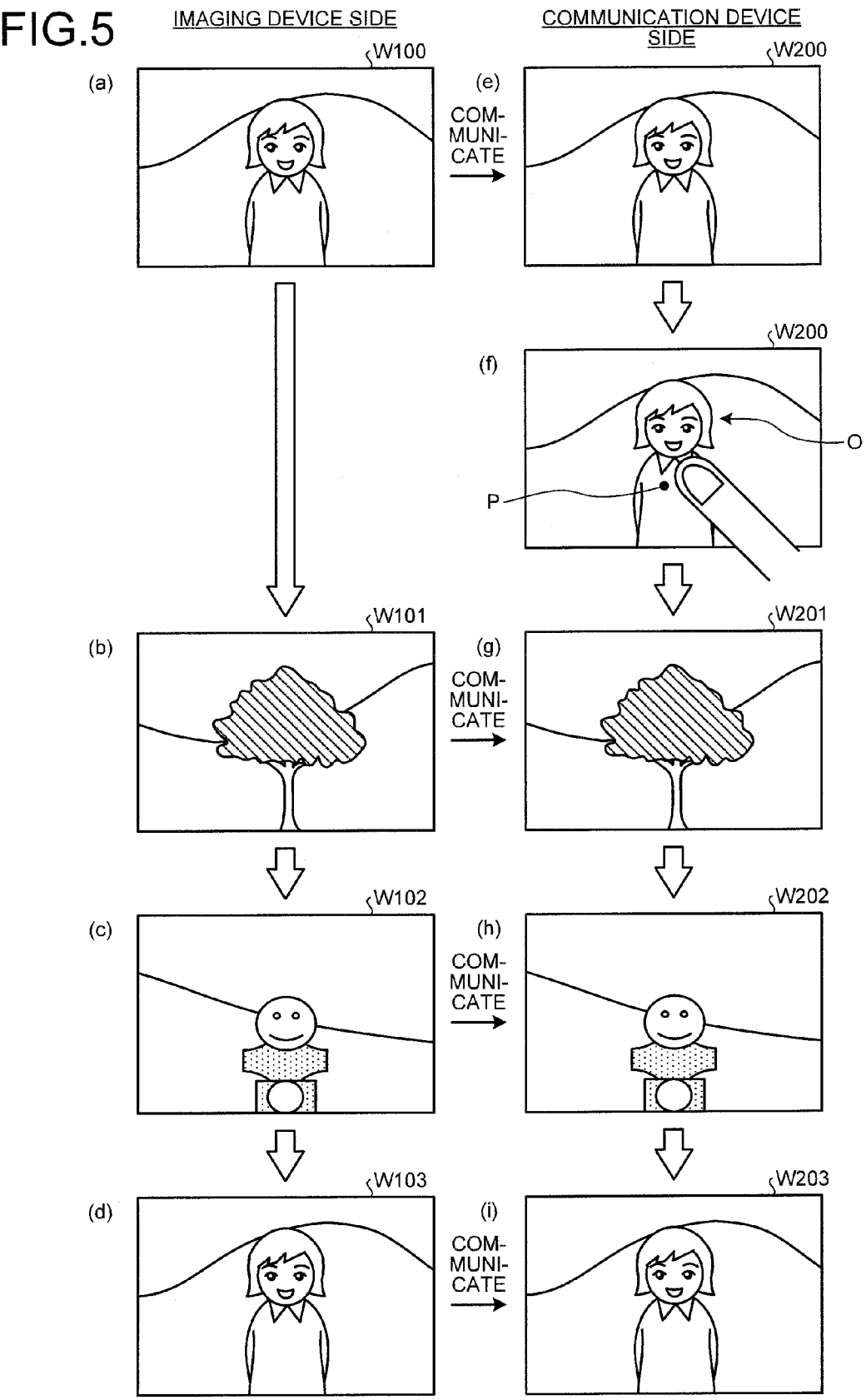
FIG. 5 is a diagram illustrating examples of an operation instruction to be issued by a user of the communication device at a time of operation (in an automatic shooting mode) of the imaging system illustrated in FIGS. 2 and 3, and images that are displayed by the imaging device and the communication device.

FIG. 4 is a diagram illustrating a view of the location where the user of the imaging device 2 is present. FIG. 5 is a diagram illustrating examples of an operation instruction to be issued by the user of the communication device 3 at a time of operation (in an automatic shooting mode) of the imaging system 1, and images that are displayed by the imaging device 2 and the communication device 3.

Specifically, (a) to (d) of FIG. 5 are diagrams illustrating examples of images that are displayed by the imaging device 2. (e) to (i) of FIG. 5 are diagrams illustrating examples of images that are displayed by the communication device 3.

For example, with respect to the live view display at the imaging device 2 (step S103), a live view image W100 illustrated in (a) of FIG. 5 is given as the live view image that is currently displayed.

In this case, as described above, the imaging device 2 transmits live view image data corresponding to the live view image W100 that is currently displayed in step S104 to the communication device 3 while performing live view display (step S103). Then, the communication device 3 sequentially displays live view images corresponding to received pieces of live view image data (step S203). Accordingly, as illustrated in (e) of FIG. 5, a live view image W200 that is displayed by the communication device 3 is an image that is substantially the same as the live view image W100 ((a) of FIG. 5) that is displayed by the imaging device 2.

Here, the user of the communication device 3 checks the live view image W200 ((e) of FIG. 5) that is displayed by the communication device 3. Then, if the user of the communication device 3 wants to make the imaging device 2 record a specified shooting target O (a person image of the female illustrated in (f) of FIG. 5) included in the live view image W200 (if the user of the communication device 3 wants the user of the imaging device 2 to perform shooting of the female subject illustrated in (f) of FIG. 5), the user of the communication device 3 touches the specified shooting target O on the display screen (the second input unit (touch panel) 32) of the imaging device 2 by a finger, as illustrated in (f) of FIG. 5.

Then, the communication device 3 determines that there is an operation instruction, based on a position signal from the second input unit (touch panel) 32 (step S204: Yes). Also, the communication device 3 generates, as the recording information, live view image data (subject image information) corresponding to the live view image W200 that is displayed at the time of issuance of the operation instruction and information about a position P ((f) of FIG. 5) in the live view image W200 which has been touched (step S205), and transmits the information to the imaging device 2 (step S206).

On the other hand, upon reception of the recording information (step S105: Yes), the imaging device 2 analyzes the live view image data (the live view image W200) included in the received recording information, and generates and records specification information for specifying the specified shooting target O including the position P (step S106).

For example, the imaging device 2 calculates the correlation between a pixel that is being focused and surrounding pixels (correlation with respect to brightness, color difference, hue, lightness, saturation and the like) by analyzing the live view image data. Also, the imaging device 2 extracts, from the correlation, feature points determining the outline of the specified shooting target O including the position P, based on the information about the position P included in the recording information. Then, the imaging device 2 generates, as specification information, image data (subject image information) regarding the specified shooting target O specified by extraction of the feature points.

After generation and recording of the specification information (step S106), the imaging device 2 determines, by pattern matching or the like, whether or not the specified shooting target O that is based on the specification information is included in the latest live view image data stored in the first memory unit 25 (step S109).

For example, if the user of the imaging device 2 moves the field of view of the imaging device 2 to the right (if the live view image displayed by the imaging device 2 sequentially changes from the live view image W100 illustrated in (a) of FIG. 5 to live view images W101 and W102 illustrated in (b) and (c) of FIG. 5), since the specified shooting target O is not included in the live view images W101 and W102, the imaging device 2 determines "No" in step S109.

On the other hand, if the user of the imaging device 2 returns the field of view of the imaging device 2 to the left (if the live view image displayed by the imaging device 2 is changed to a live view image W103 illustrated in (d) of FIG. 5), since the specified shooting target O is included in the live view image W103, the imaging device 2 determines "Yes" in step S109. Then, the imaging device 2 records live view image data corresponding to the live view image W103 in the image data recording unit 263 (step S110).

Additionally, when the field of view of the imaging device 2 is being changed in the manner described above, live view images W201 to W203 corresponding to the live view images W101 to W103, respectively, are displayed by the communication device 3 as illustrated in (g) to (i) of FIG. 5.

Manual Shooting Mode

Figure 6:
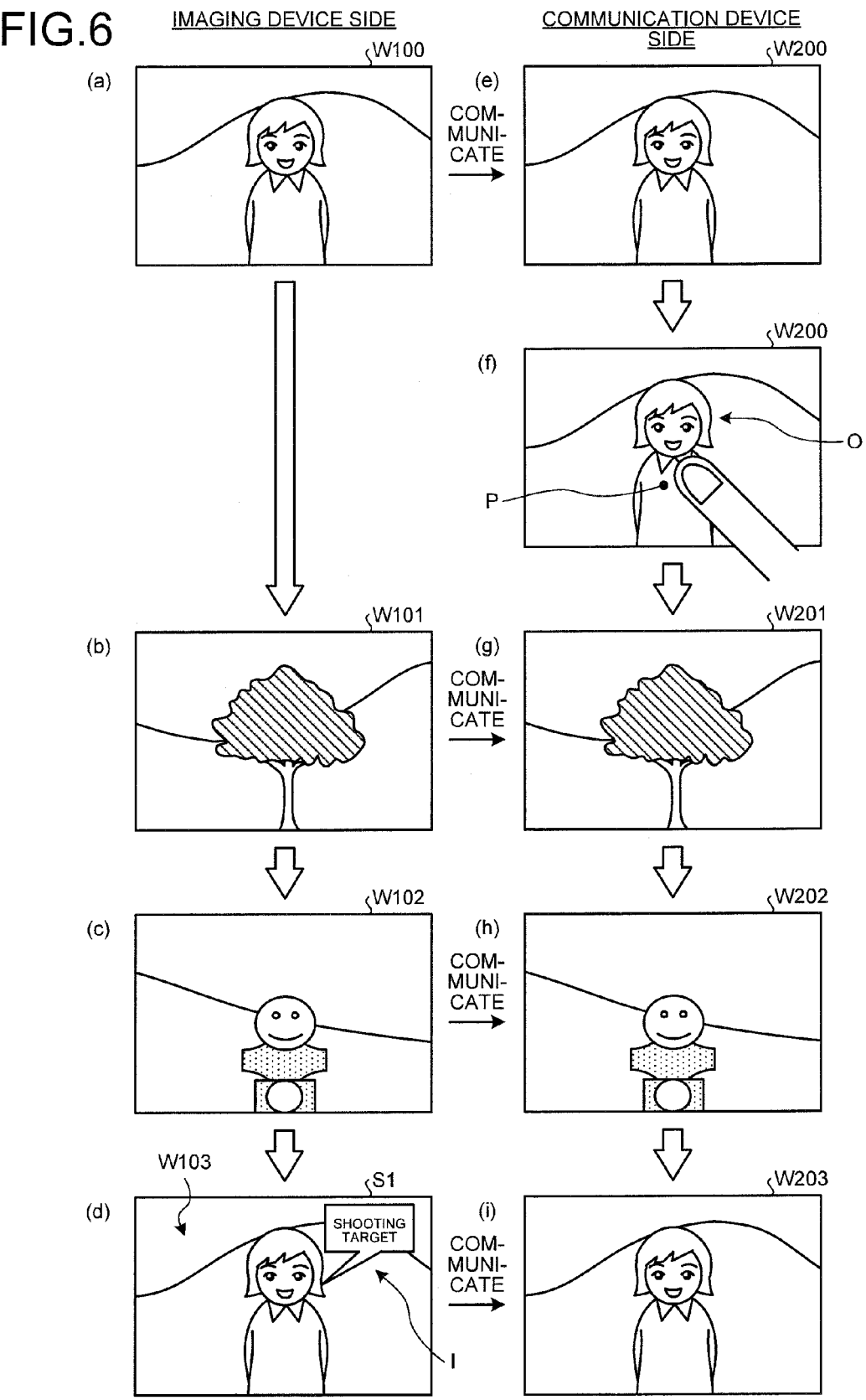
FIG. 6 is a diagram illustrating examples of an operation instruction to be issued by the user of the communication device at a time of operation (in a manual shooting mode) of the imaging system illustrated in FIGS. 2 and 3, and images that are displayed by the imaging device and the communication device.

FIG. 6 is a diagram illustrating examples of an operation instruction to be issued by the user of the communication device 3 at a time of operation (in a manual shooting mode) of the imaging system 1, and images that are displayed by the imaging device 2 and the communication device 3.

Additionally, in FIG. 6, the operation instruction to be issued by the user of the communication device 3 is the same as that in FIG. 5. Also, in FIG. 6, the operation of changing the field of view of the imaging device 2 to be performed by the user of the imaging device 2 is also the same as that in FIG. 5. Accordingly, live view images W100 to W103, and W200 to W203 illustrated in (a) to (i) of FIG. 6 are the same as the live view images W100 to W103, and W200 to W203 illustrated in (a) to (i) of FIG. 5, respectively.

In the following, aspects different from the automatic shooting mode will be mainly described.

After generating and recording specification information by the same process as that in the automatic shooting mode (step S106), the imaging device 2 determines, as in step S109, whether or not a specified shooting target O is included in the latest live view image data stored in the first memory unit 25 (step S111).

For example, if the user of the imaging device 2 changes the field of view of the imaging device 2 to the right (if the live view image displayed by the imaging device 2 is sequentially changed from the live view image W100 illustrated in (a) of FIG. 6 to the live view images W101 and W102 illustrated in (b) and (c) of FIG. 6), since the specified shooting target O is not included in the live view images W101 and W102, the imaging device 2 determines "No" in step Sill.

On the other hand, if the user of the imaging device 2 returns the field of view of the imaging device 2 to the left (if the live view image displayed by the imaging device 2 is changed to the live view image W103 illustrated in (d) of FIG. 6), since the specified shooting target O is included in the live view image W103, the imaging device 2 determines "Yes" in step S111. Then, as illustrated in (d) of FIG. 6, the imaging device 2 displays, for a predetermined period of time, a superimposed image S1 that is obtained by superimposing, on the live view image W103, identification information I for identifying the specified shooting target O (in the example illustrated in (d) of FIG. 6, information which is the balloon pointing to the specified shooting target O, in which a message "shooting target" is written) included in the live view image W103 (step S112), and urges the user of the imaging device 2 to perform a shooting operation. When the user of the imaging device 2 performs the shooting operation, the imaging device 2 records the latest live view image data (the live view image W103) in the image data recording unit 263 (step S114).

When recording information is received from the communication device 3, the imaging device 2 according to the first embodiment described above generates specification information for specifying the specified shooting target, based on the recording information. Then, the imaging device 2 records the specification information in the specification information recording unit 262.

Thus, the imaging device 2 may determine whether or not the specified shooting target is included in the latest live view image data, based on the specification information recorded in the specification information recording unit 262. That is, in the case where the specified shooting target is determined to be included, the imaging device 2 may automatically record the live view image data in the image data recording unit 263, or perform display (in the example in FIG. 6, display of the identification information I) for urging the user of the imaging device 2 to perform a shooting operation.

Accordingly, with the imaging device 2 according to the first embodiment, shooting of a specified shooting target may be performed not at the current time point but at a later time by having the specification information for specifying the specified shooting target generated and recorded, and the convenience may be increased.

Also, according to the first embodiment, image data regarding a specified shooting target (subject image information) is included in the recording information and the specification information, and thus, whether or not the specified shooting target is included in image data generated by the imaging unit 21 may be easily determined by pattern matching or the like.

Second Embodiment

Next, a second embodiment of the present invention will be described.

In the following description, the structural elements and steps the same as those of the first embodiment described above will be denoted by the same reference signs, and detailed description thereof will be omitted, or the description will be simplified.

In the second embodiment, the imaging system 1 described in the first embodiment described above is applied to an imaging system that uses a digital camera by adopting the digital camera as the imaging device 2.

In the following, the configuration of an imaging device 2A configuring an imaging system 1A according to the second embodiment will be described. Additionally, a communication device 3 configuring the imaging system 1A is the same as the communication device 3 described in the first embodiment above, and description thereof is omitted.

Schematic Configuration of Imaging Device

Figure 7:
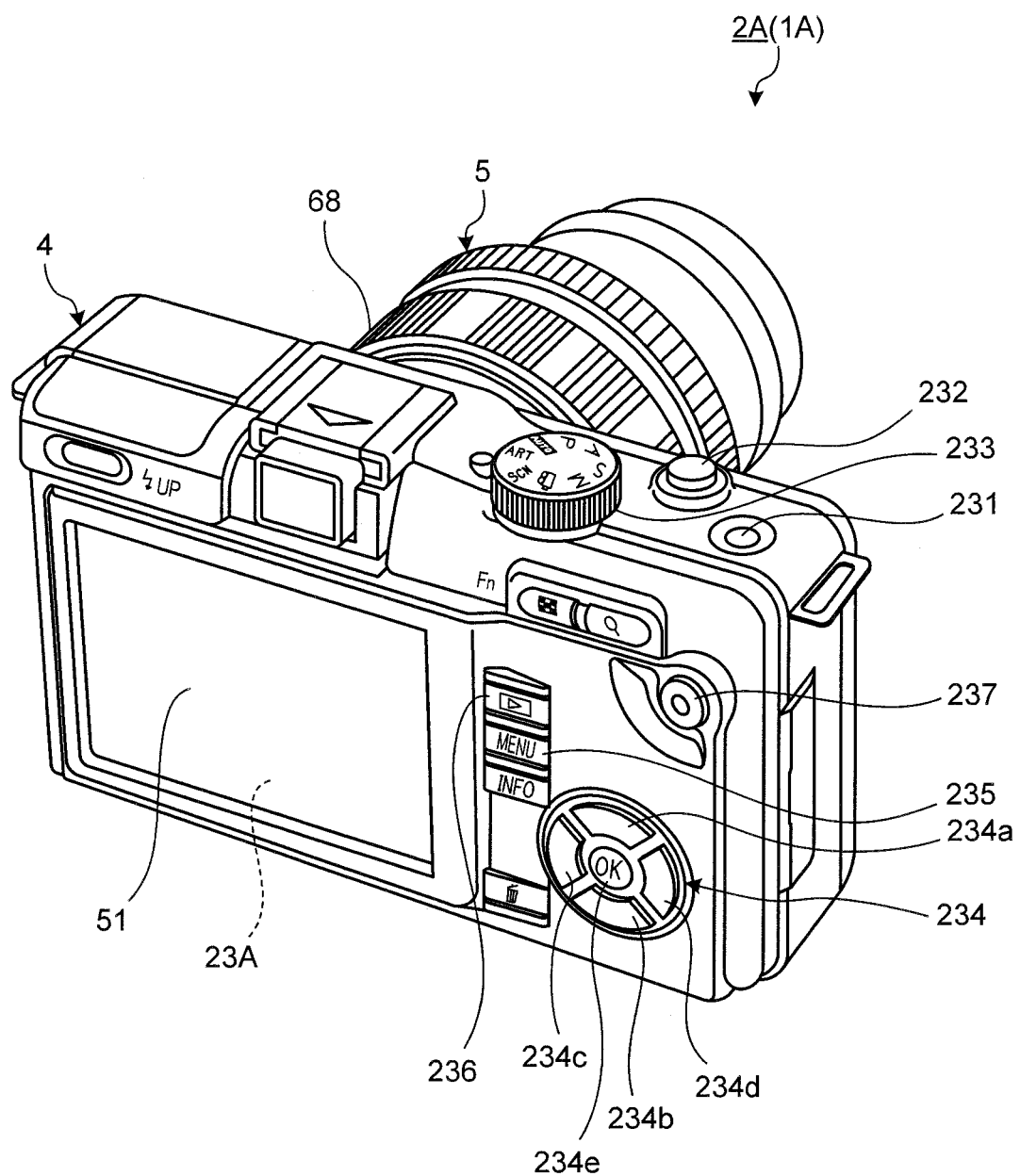
FIG. 7 is a perspective view illustrating a configuration of an imaging device according to a second embodiment, on the side that is to face a user.
Figure 8:
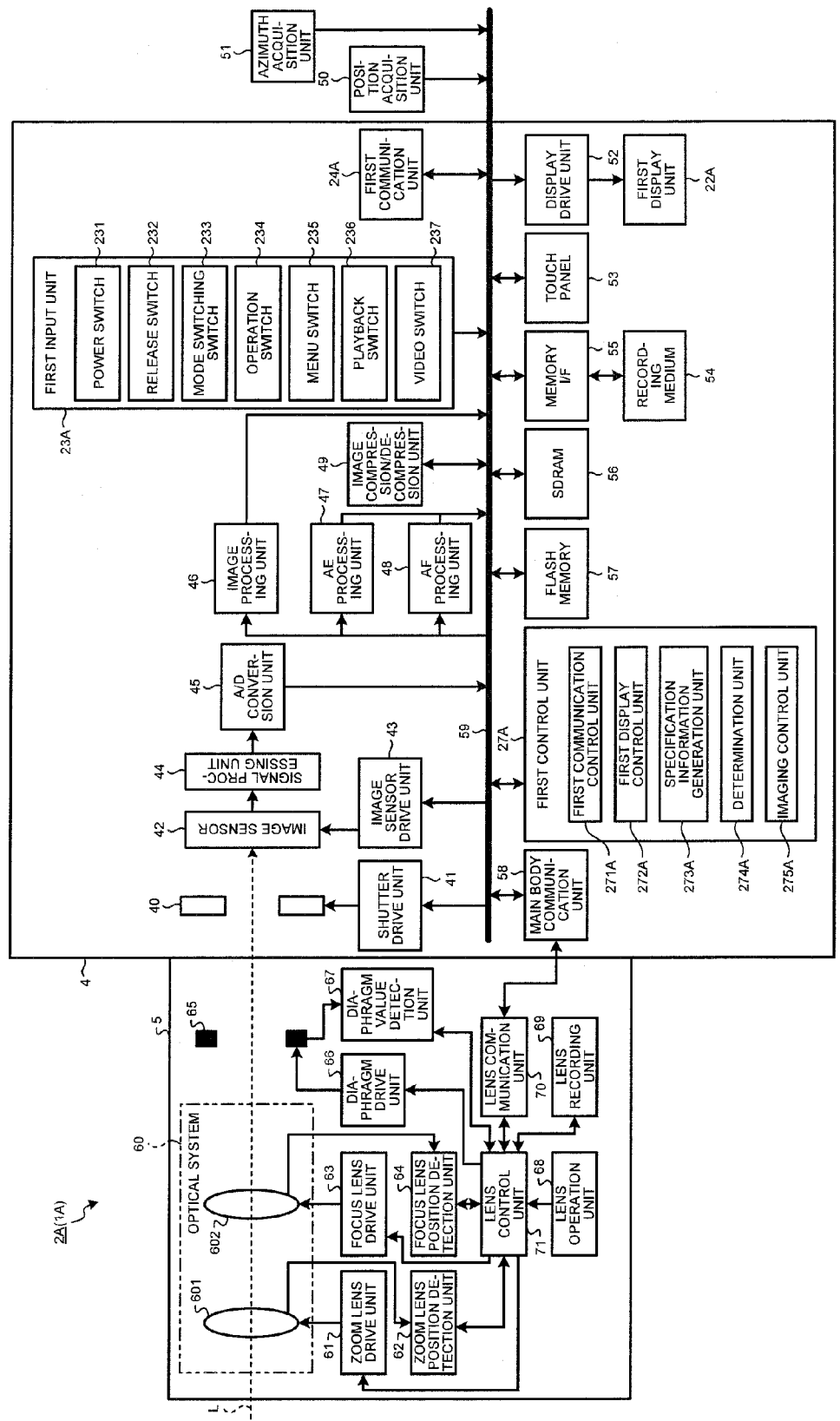
FIG. 8 is a block diagram illustrating a configuration of the imaging device illustrated in FIG. 7.

FIG. 7 is a perspective view illustrating the configuration of the imaging device 2A according to the second embodiment of the present invention, on the side that is to face the user (the front side). FIG. 8 is a block diagram illustrating the configuration of the imaging device 2A.

The imaging device 2A according to the second embodiment includes, as illustrated in FIG. 7 or FIG. 8, a main body 4, and a lens unit 5 capable of being attached to or detached from the main body 4.

Configuration of Main Body

As illustrated in FIG. 7, the main body 4 includes, in addition to a first display unit 22A, a first input unit 23A, a first communication unit 24A, and a first control unit 27A corresponding respectively to the structural elements 22 to 24 and 27 described in the first embodiment above, a shutter 40, a shutter drive unit 41, an image sensor 42, an image sensor drive unit 43, a signal processing unit 44, an A/D conversion unit 45, an image processing unit 46, an AE processing unit 47, an AF processing unit 48, an image compression/decompression unit 49, a position acquisition unit 50, an azimuth acquisition unit 51, a display drive unit 52, a touch panel 53, a recording medium 54, a memory I/F 55, an SDRAM (Synchronous Dynamic Random Access Memory) 56, a flash memory 57, a main body communication unit 58, a bus 59, and the like.

The shutter 40 sets the state of the image sensor 42 to an exposure state or a light shielding state.

The shutter drive unit 41 is configured by using a stepper motor or the like, and drives the shutter 40 according to an instruction signal that is input from the first control unit 27A.

The image sensor 42 is configured by using a CCD or the like for receiving light collected by the lens unit 5 and converting the light into an electrical signal.

The image sensor drive unit 43 causes image data (an analog signal) to be output from the image sensor 42 to the signal processing unit 44 at a predetermined timing, according to an instruction signal input from the first control unit 27A.

In this sense, the image sensor drive unit 43 functions as an electronic shutter.

The signal processing unit 44 performs analog processing on the analog signal that is input from the image sensor 42, and outputs the signal to the A/D conversion unit 45.

Specifically, the signal processing unit 44 performs noise reduction processing, a gain up processing and the like on the analogy signal. For example, the signal processing unit 44 performs, on the analog signal, waveform shaping after reducing reset noise or the like, and then, performs gain up so as to achieve intended lightness.

The A/D conversion unit 45 generates digital image data (RAW data) by performing A/D conversion on the analog signal that is input from the signal processing unit 44, and outputs the data to the SDRAM 56 via the bus 59.

The image sensor 42, the signal processing unit 44, and the A/D conversion unit 45 described above function as an imaging unit of the present invention.

Under the control of the first control unit 27A, the image processing unit 46 acquires image data from the SDRAM 56 via the bus 59, and performs various types of image processing on the acquired image data. The image data on which the image processing has been performed is output to the SDRAM 56 via the bus 59.

The various types of image processing to be performed by the image processing unit 46 include basic image processing and special image processing.

The basic image processing is basic image processing including optical black subtraction processing, white balance adjustment processing, and, in the case where the image sensor is of the Bayer array, synchronization processing for image data, color matrix subtraction processing, γ correction processing, color reproduction processing, edge enhancement processing, and the like.

The special image processing is image processing for achieving visual effects such as "pop art", "fantasic focus", "toy photo", "diorama", "rough monochrome", and the like (for example, see Japanese Patent Application Laid-open No. 2010-74244, Japanese Patent Application Laid-open No. 2010-62836, and the like).

The AE processing unit 47 acquires, via the bus 59, image data that is stored in the SDRAM 56, and sets an exposure condition for still image shooting or video shooting based on the acquired image data.

Specifically, the AE processing unit 47 calculates the brightness from the image data and determines the diaphragm value, the exposure time, the ISO sensitivity, and the like based on the calculated brightness to thereby perform auto exposure of the imaging device 2A.

The AF processing unit 48 acquires, via the bus 59, image data that is stored in the SDRAM 56, and performs adjustment of auto focus of the imaging device 2A based on the acquired image data.

For example, the AF processing unit 48 performs adjustment of auto focus of the imaging device 2A by determining focusing evaluation for the imaging device 2A by extracting a signal of a high frequency component from the image data and performing AF (Auto Focus) arithmetic processing on the signal of a high frequency component.

Additionally, the adjustment method of auto focus of the imaging device 2A may be a method of acquiring a phase difference signal by the image sensor or of a type where a dedicated AF optical system or the like is mounted.

The image compression/decompression unit 49 acquires image data from the SDRAM 56 via the bus 59, compresses the acquired image data according to a predetermined format, and outputs the compressed image data to the SDRAM 56.

Here, the compression method for a still image is a JPEG (Joint Photographic Experts Group) method, a TIFF (Tagged Image File Format) method or the like. Also, the compression method for a video is a Motion JPEG method, an MP4 (H.264) method or the like.

Also, the image compression/decompression unit 49 acquires, via the bus 59 and the memory I/F 55, image data (compressed image data) that is recorded in the recording medium 54, decompresses (expands) the acquired image data, and outputs the same to the SDRAM 56.

The position acquisition unit 50 receives orbit information of satellites transmitted from a plurality of GPS satellites configuring a GPS (Global Positioning System) which is measurement means for measuring the position of an object on the earth, and acquires position information (information about longitude and latitude) of the imaging device 2A based on the received orbit information. Then, the position acquisition unit 50 outputs the position information of the imaging device 2A to the first control unit 27A.

When an optical axis L (FIG. 8) of the lens unit 5 is substantially horizontal, the azimuth acquisition unit 51 acquires, as azimuth information, the azimuth of the imaging device 2A where the direction of the optical axis L of the lens unit 5 facing the field of view area is the reference azimuth.

Specifically, the azimuth acquisition unit 51 is configured by using a magnetic azimuth sensor or the like, and acquires the azimuth information of the imaging device 2A by detecting vertical and horizontal components of geomagnetism and detecting, as an azimuth angle, the angle formed by a reference azimuth taking the north as the reference and the optical axis L of the imaging device 2A.

The first input unit 23A according to the second embodiment receives a user operation, and outputs an instruction signal according to the user operation to the first control unit 27A via the bus 59.

As illustrated in FIG. 7 or FIG. 8, the first input unit 23A includes a power switch 231 for switching the power state of the imaging device 2A between an on state and an off state, a release switch 232 for outputting a still image release signal and issuing an instruction regarding still image shooting, a mode switching switch 233 for switching between modes of the imaging device 2A (shooting modes (a still image shooting mode and a video shooting mode), a playback mode, and the like), an operation switch 234 for switching between various settings of the imaging device 2A, a menu switch 235 for displaying various settings of the imaging device 2A on the first display unit 22A, a playback switch 236 for displaying an image corresponding to image data recorded in the recording medium 54 on the first display unit 22A, a video switch 237 for outputting a video release signal and issuing an instruction regarding video shooting, and the like.

The release switch 232 may be moved forward or backward by an external pressure, and when it is pressed halfway, it outputs a first release signal to the first control unit 27A and issues an instruction regarding shooting preparation operation, and when it is pressed all the way, it outputs a second release signal to the first control unit 27A and issues an instruction regarding still image shooting.

The operation switch 234 includes direction switches 234a to 234d for up/down/left/right used to perform selection setting on a menu screen or the like, and a determination switch 234e (an OK switch) for determining the operation by each of the direction switches 234a to 234d on the menu screen or the like (FIG. 7). Additionally, the operation switch 234 may alternatively be configured by using a dial switch or the like.

In the second embodiment, as in the first embodiment described above, the imaging device 2A is set to the automatic shooting mode or the manual shooting mode by an operation, on a menu screen, by the user of the imaging device 2A on the operation switch 234. Moreover, setting information indicating which of the automatic shooting mode and the manual shooting mode is set is stored in the SDRAM 56.

Under the control of the first control unit 27A, the display drive unit 52 acquires, via the bus 59, image data that is stored in the SDRAM 56 (image data obtained by performing basic image processing or special image processing on the RAW data) or image data that is recorded in the recording medium 54, and causes the first display unit 22A to display an image corresponding to the acquired image data.

Here, display of an image includes live view display of displaying a live view image corresponding to image data that is obtained by performing basic image processing or special image processing on the RAW data, rec view display of displaying an image corresponding to image data immediately after shooting for a predetermined period of time, playback display of playing back image data recorded in the recording medium 54, and the like.

Also, the first display unit 22A according to the second embodiment displays operation information of the imaging device 2A and information about an operation as appropriate.

The first communication unit 24A according to the second embodiment performs, under the control of the first control unit 27A, wireless communication, with a communication device which is a communication counterpart set by the user of the imaging device 2A on the menu screen or the like (in the second embodiment, the communication device 3 (see FIG. 1)), of various types of data including live view image data and signals necessary for communication, according to a predetermined protocol.

In the second embodiment, the live view image data is image data that is stored in the SDRAM 56 and that is to be used for live view display (image data that is obtained by performing basic image processing or special image processing on the RAW data).

As illustrated in FIG. 7, the touch panel 53 is provided on the display screen of the first display unit 22A, and detects a touch by an object from outside and outputs a position signal according to the detected touch position.

The recording medium 54 has a function as a recording unit according to the present invention.

Specifically, the recording medium 54 is configured by using a memory card or the like that is mounted on the imaging device 2A from outside, and is mounted to the imaging device 2A via the memory I/F 55 in an attachable/detachable manner.

Image data which has been processed by the image processing unit 46 or the image compression/decompression unit 49 is written to the recording medium 54 by a read/write device, not illustrated, according to the type of the recording medium 54, or image data recorded in the recording medium 54 is read by the read/write device. Also, the recording medium 54 may output, under the control of the first control unit 27A, programs and various pieces of information to the flash memory 57 via the memory I/F 55 and the bus 59.

The SDRAM 56 is configured by using a volatile memory, and temporarily stores image data that is input from the A/D conversion unit 45 via the bus 59 (RAW data), image data that is obtained by performing basic image processing or special image processing on the RAW data by the image processing unit 46, recording information received from the communication device 3 via the first communication unit 24A, setting information of the automatic shooting mode or the manual shooting mode, and information of the imaging device 2A which is being processed.

The flash memory 57 is configured by using a non-volatile memory.

The flash memory 57 records various programs (including an imaging program) for causing the imaging device 2A to operate, various types of data to be used during execution of programs, various parameters that are necessary for image processing operation by the image processing unit 46, and the like.

The main body communication unit 58 is a communication interface for performing communication with the lens unit 5 mounted on the main body 4.

The bus 59 is configured by using a transmission channel or the like for connecting each structural element of the imaging device 2A, and transfers various types of data generated inside the imaging device 2A to each structural element of the imaging device 2A.

The first control unit 27A according to the second embodiment controls the operation of the imaging device 2A in an overall manner by, for example, issuing an instruction or performing transfer of data, via the bus 59, to a corresponding unit configuring the imaging device 2A according to an instruction signal from the first input unit 23A, a position signal from the touch panel 53, recording information received by the first communication unit 24A, or the like.

For example, in the case where a second release signal is input, or the imaging device 2A is set to the automatic shooting mode and a specified shooting target is included in the latest live image data that is stored in the SDRAM 56, the first control unit 27A performs control of starting a shooting operation by the imaging device 2A.

The shooting operation by the imaging device 2A here refers to operations of the signal processing unit 44, the A/D conversion unit 45, and the image processing unit 46 for performing predetermined processing on image data output by the image sensor 42 according to driving by the shutter drive unit 41 and the image sensor drive unit 43. Image data which has been processed in the above manner is compressed by the image compression/decompression unit 49 and provisionally recorded in the recording medium 54 via the bus 59 and the memory I/F 55, under the control of the first control unit 27A.

As illustrated in FIG. 8, the first control unit 27A includes a first communication control unit 271A, a first display control unit 272A, a specification information generation unit 273A, a determination unit 274A, and an imaging control unit 275A corresponding, respectively, to the structural elements 271 to 275 of the first control unit 27 described in the first embodiment above.

The main body 4 configured in the above manner may be provided with an audio input/output function, a flash function, an electronic viewfinder (EVF) capable of being attached or detached, and the like.

Configuration of Lens Unit

As illustrated in FIG. 8, the lens unit 5 includes an optical system 60, a zoom lens drive unit 61, a zoom lens position detection unit 62, a focus lens drive unit 63, a focus lens position detection unit 64, a diaphragm 65, a diaphragm drive unit 66, a diaphragm value detection unit 67, a lens operation unit 68, a lens recording unit 69, a lens communication unit 70, and a lens control unit 71.

The optical system 60 collects light in a predetermined field of view area, and forms an image on an imaging surface of the image sensor 42 based on the collected light. As illustrated in FIG. 8, the optical system 60 includes a zoom lens 601, and a focus lens 602.

The zoom lens 601 is configured by using one or a plurality of lenses, and changes the zoom magnification of the optical system 60 by moving along an optical axis L (FIG. 8).

The focus lens 602 is configured by using one or a plurality of lenses, and changes the point of focus and the focal length of the optical system 60 by moving along the optical axis L.

The zoom lens drive unit 61 is configured by using a stepper motor, a DC motor and the like, and causes the zoom lens 601 to move along the optical axis L under the control of the lens control unit 71.

The zoom lens position detection unit 62 is configured by using a photointerrupter and the like, and detects the position of the zoom lens 601 moved by the zoom lens drive unit 61.

Specifically, the zoom lens position detection unit 62 converts the number of rotations of a drive motor included in the zoom lens drive unit 61 into the number of pulses, and detects the position of the zoom lens 601 on the optical axis L based on a specific reference position determined in advance, based on the number of pulses after conversion.

The focus lens drive unit 63 is configured by using a stepper motor, a DC motor and the like, and causes the focus lens 602 to move along the optical axis L under the control of the lens control unit 71.

The focus lens position detection unit 64 is configured by using a photointerrupter and the like, and detects the position on the optical axis L of the focus lens 602 moved by the focus lens drive unit 63 by the same method as that of the zoom lens position detection unit 62.

The diaphragm 65 performs adjustment of exposure by limiting the amount of incidence of light collected by the optical system 60.

The diaphragm drive unit 66 is configured by using a stepper motor and the like, and adjusts the amount of light entering the image sensor 42 by driving the diaphragm 65 under the control of the lens control unit 71.

The diaphragm value detection unit 67 detects the diaphragm value of the diaphragm 65 by detecting the state of the diaphragm 65 driven by the diaphragm drive unit 66. The diaphragm value detection unit 67 is configured by using a potentiometer such as a linear encoder or a variable resistance element, an A/D conversion circuit, and the like.

As illustrated in FIG. 7 or FIG. 8, the lens operation unit 68 is an operation ring or the like that is provided around the lens barrel of the lens unit 5, and receives a user operation regarding an instruction regarding the operation of the zoom lens 601 or the focus lens 602 in the optical system 60 or the operation of the imaging device 2A. Additionally, the lens operation unit 68 may be a push-type switch or the like.

The lens recording unit 69 records control programs for determining the position and the movement of the optical system 60 and the diaphragm 65, the magnification, the focal length, the field of view, the aberration and the F value (brightness) of the optical system 60, and the like.

The lens communication unit 70 is a communication interface for performing communication with the main body communication unit 58 of the main body 4 when the lens unit 5 is mounted on the main body 4.

The lens control unit 71 is configured by using a CPU and the like, and controls the operation of the lens unit 5 according to an instruction signal or a drive signal from the first control unit 27A input via the main body communication unit 58 and the lens communication unit 70.

Also, the lens control unit 71 outputs, to the first control unit 27A, via the main body communication unit 58 and the lens communication unit 70, the position of the zoom lens 601 detected by the zoom lens position detection unit 62, the position of the focus lens 602 detected by the focus lens position detection unit 64, and the diaphragm value of the diaphragm 65 detected by the diaphragm value detection unit 67.

Operation of Imaging System

Next, the operation of the imaging system 1A according to the second embodiment will be described.

Here, the operation of the communication device 3 according to the second embodiment is the same as the operation of the communication device 3 described in the first embodiment (FIG. 3). Accordingly, in the following, only the operation of the imaging device 2A (an imaging method according to the present invention) will be described.

Operation of Imaging Device

Figure 9:
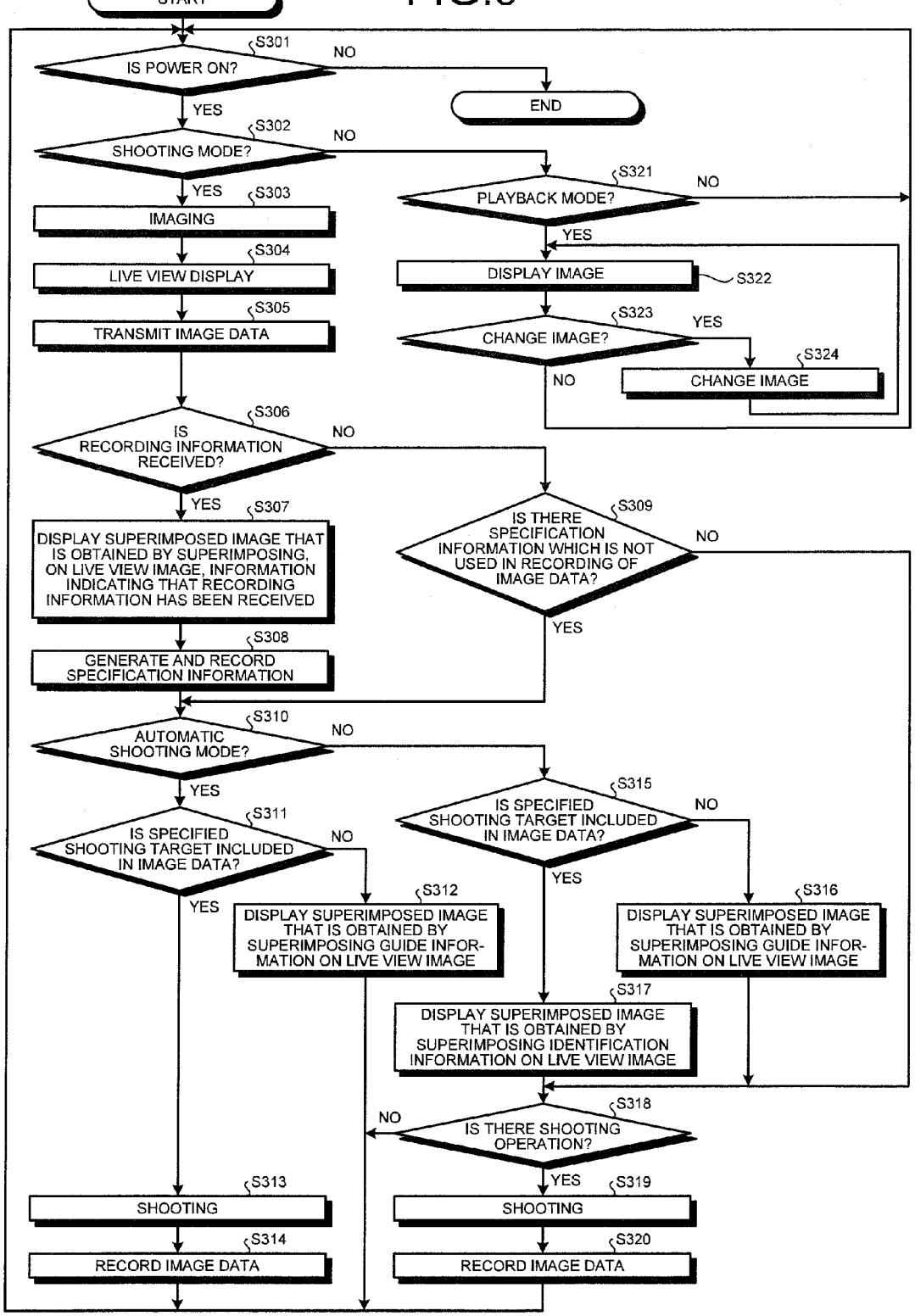
FIG. 9 is a flow chart illustrating an operation of the imaging device illustrated in FIGS. 7 and 8.

FIG. 9 is a flow chart illustrating the operation of the imaging device 2A according to the second embodiment.

Additionally, for the sake of convenience of description, in FIG. 9, the operation of the imaging device 2A in a case where the imaging device 2A is set to a communication mode (a mode of performing communication with the communication device 3) on the menu screen, for example, by the user of the imaging device 2A is illustrated. Also in the following, description will be given assuming that the imaging device 2A is set to the communication mode.

Figure 10:
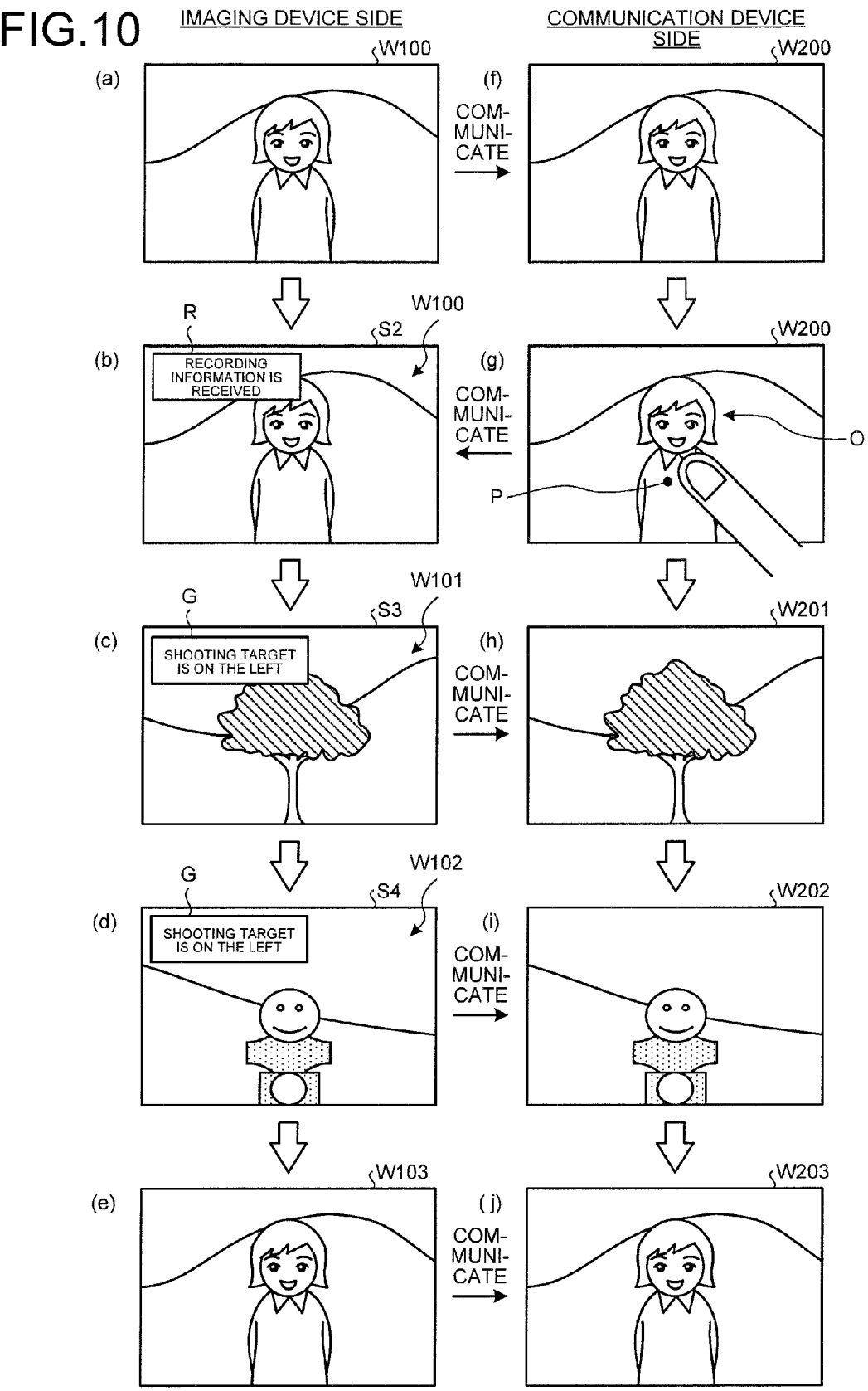
FIG. 10 is a diagram illustrating examples of an operation instruction to be issued by a user of the communication device at a time of operation (in an automatic shooting mode) of the imaging system illustrated in FIG. 9, and images that are displayed by the imaging device and the communication device.
Figure 11:
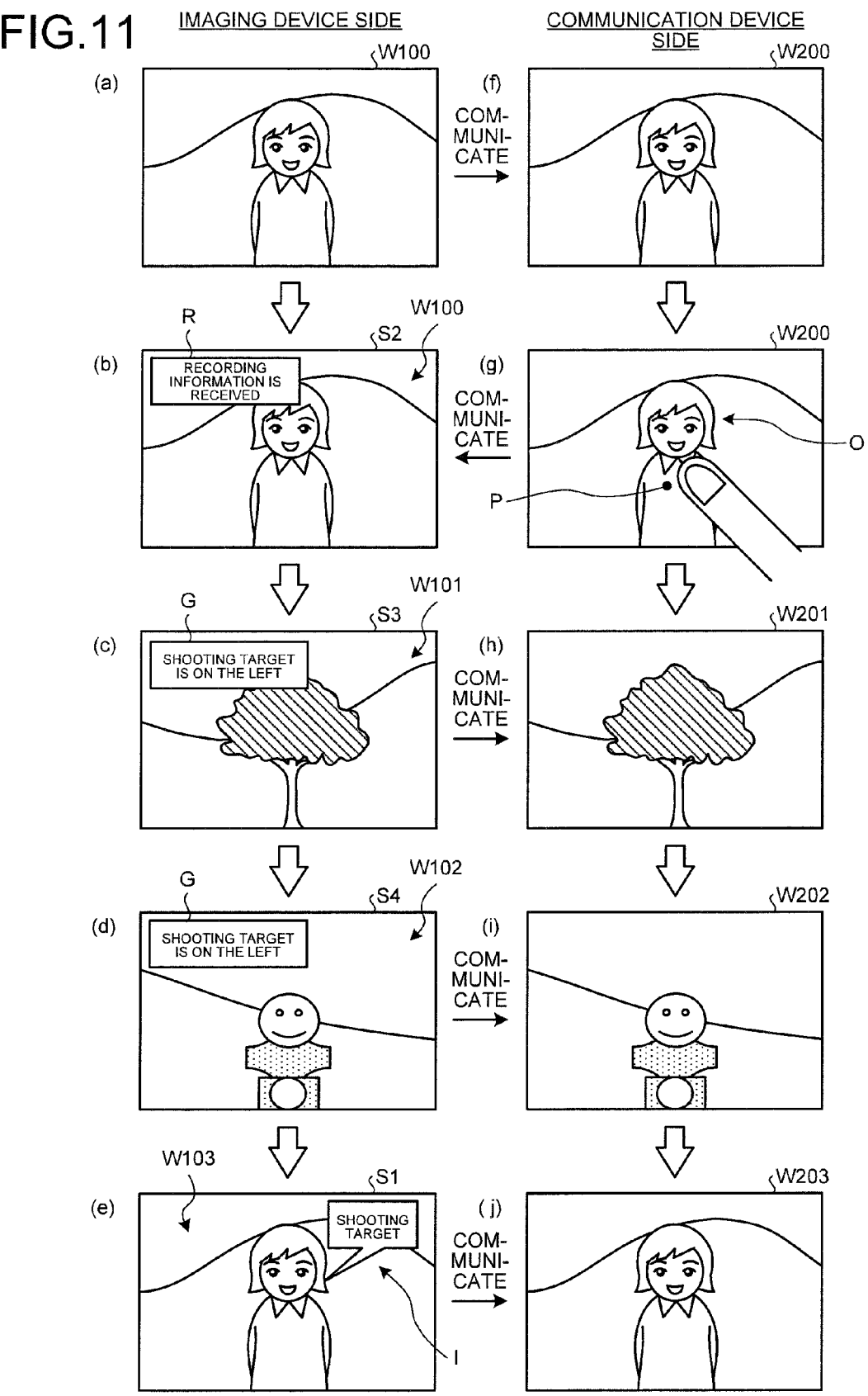
FIG. 11 is a diagram illustrating examples of an operation instruction to be issued by the user of the communication device at a time of operation (in a manual shooting mode) of the imaging system illustrated in FIG. 9, and images that are displayed by the imaging device and the communication device.

FIG. 10 is a diagram illustrating examples of an operation instruction to be issued by the user of the communication device 3 at a time of operation (in an automatic shooting mode) of the imaging system 1A, and images that are displayed by the imaging device 2A and the communication device 3. FIG. 11 is a diagram illustrating examples of an operation instruction to be issued by the user of the communication device 3 at a time of operation (in a manual shooting mode) of the imaging system 1A, and images that are displayed by the imaging device 2A and the communication device 3.

Additionally, in FIGS. 10 and 11, the operation instruction to be issued by the user of the communication device 3 is the same as the operation instruction described in the first embodiment above ((f) of FIG. 5). Also, in FIGS. 10 and 11, the operation of changing the field of view of the imaging device 2A to be performed by the user of the imaging device 2A is also the same as the operation described in the first embodiment above ((a) to (d) of FIG. 5). Accordingly, live view images W100 to W103, and W200 to W203 illustrated in (a) to (j) of FIG. 10 and (a) to (j) of FIG. 11 are the same as the live view images W100 to W103, and W200 to W203 illustrated in (a) to (i) of FIG. 5, respectively.

When the power of the imaging device 2A is turned on by operation of the power switch 231 by the user of the imaging device 2A (step S301: Yes), the first control unit 27A determines whether or not the imaging device 2A is set to a shooting mode by the operation of the mode switching switch 233 by the user of the imaging device 2A (step S302).

When it is determined that the imaging device 2A is set to the shooting mode (step S302: Yes), the first control unit 27A starts imaging by the image sensor 42 (step S303: imaging step).

Specifically, the first control unit 27A drives the image sensor drive unit 43 to thereby perform shooting by an electronic shutter. Also, the image processing unit 46 performs basic image processing or special image processing on image data that is generated by the image sensor 42 by shooting by the electronic shutter and stored in the SDRAM 56.

Next, the first display control unit 272A causes the first display unit 22A to start live view display (step S304).

Specifically, the first display control unit 272A causes the first display unit 22A to sequentially display a live view image corresponding to the latest live view image data which has been subjected to the basic image processing or the special image processing by the image processing unit 46 and stored in the SDRAM 56.

Next, the first communication control unit 271A causes the latest live view image data that is stored in the SDRAM 56 (the same image data as that of the live view image that is displayed by the first display unit 22A in step S304) to be sequentially transmitted to the communication device 3 via the first communication unit 24A (step S305: transmission step).

Additionally, for the sake of convenience of description, in FIG. 9, step S305 is illustrated to be performed after step S304, but in reality, steps S304 and S305 are performed approximately at the same time.

Then, as in step S105 described in the first embodiment above, the first communication control unit 271A determines whether or not recording information is received (step S306).

If it is determined that recording information is received (step S306: Yes), the first control unit 27A stores the recording information in the SDRAM 56. Then, the first display control unit 272A causes the first display unit 22A to display, for a predetermined period of time, a superimposed image that is obtained by superimposing information indicating that recording information has been received on a live view image corresponding to the latest live view image data that is stored in the SDRAM 56 (step S307).

For example, in the case where the recording information described in the first embodiment above is received (step S306: Yes), the first display control unit 272A causes, in step S307, the first display unit 22A to display, for a predetermined period of time, a superimposed image S2 that is obtained by superimposing information R indicating that recording information has been received on the latest live view image W100, as illustrated in (b) of FIG. 10 or (b) of FIG. 11.

Also, the specification information generation unit 273A generates specification information for specifying a specified shooting target, based on the recording information that is stored in the SDRAM 56, and records the specification information in the recording medium 54 (step S308: specification information generation step). Then, the imaging device 2 proceeds to step S310.

Additionally, for the sake of convenience of description, in FIG. 9, step S308 is illustrated to be performed after step S307, but in reality, steps S307 and S308 are performed approximately at the same time.

Specifically, in step S308, the specification information generation unit 273A generates the specification information in the following manner.

The specification information generation unit 273A stores, in the SDRAM 56, position information and azimuth information that are acquired respectively by the position acquisition unit 50 and the azimuth acquisition unit 51 (in the examples of FIGS. 10 and 11, information indicating the position where the specified shooting target O is, for example) at the time of reception of the recording information (step S306: Yes). Then, as in the first embodiment described above, the specification information generation unit 273A specifies the specified shooting target by analyzing live view image data (in the examples of FIGS. 10 and 11, the live view image W200) included in the recording information, and generates, as the specification information, image data regarding the specified shooting target which has been specified and the position information and the azimuth information which have been stored in the SDRAM 56.

On the other hand, if it is determined that recording information is not received (step S306: No), the first control unit 27A refers to the specification information recorded in the recording medium 54, and determines whether or not there is specification information which is not used in recording of image data (steps S314 and S320 described later) (step S309), as in step S107 described in the first embodiment above.

If it is determined that there is no specification information which is not used in recording of image data (step S309: No), the imaging device 2A proceeds to step S318.

On the other hand, if it is determined that there is specification information which is not used in recording of image data (step S309: Yes), the imaging device 2A proceeds to step S310.

After step S308, or if it is determined in step S309 that there is specification information which is not used in recording of image data (step S309: Yes), the first control unit 27A refers to the setting information stored in the SDRAM 56, and determines whether or not the imaging device 2A is set to the automatic shooting mode (step S310), as in step S108 described in the first embodiment above.

If it is determined that the imaging device 2A is set to the automatic shooting mode (step S310: Yes), the determination unit 274A determines, based on the specification information recorded in the recording medium 54, whether or not the specified shooting target is included in the latest live view image data that is stored in the SDRAM 56 (step S311), as in steps S109 and S111 described in the first embodiment above.

Here, the specification information used in step S311 includes, in addition to the latest specification information that is recorded in the recording medium 54, specification information which is determined in step S309 to not have been used in recording of image data, among pieces of specification information that are already recorded.

If it is determined that the specified shooting target is not included in the latest live view image data (step S311: No), the first display control unit 272A causes the first display unit 22A to display, for a predetermined period of time, a superimposed image that is obtained by superimposing, on the live view image corresponding to the latest live view image data that is stored in the SDRAM 56, guide information indicating the direction or the position where the specified shooting target is present (in the example of FIG. 10, superimposed images S3 and S4 that are obtained by superimposing guide information G, i.e. a message "shooting target is on the left", on the live view images W101 and W102) (step S312). Then, the imaging device 2A returns to step S301.

Specifically, in step S312, the first display control unit 272A reads the position information and the azimuth information (in the example of FIG. 10, information indicating the position where the specified shooting target O is present, and the like) included in the specification information that is recorded in the recording medium 54. Also, the first display control unit 272A acquires the position information and the azimuth information of the imaging device 2A that are acquired respectively by the position acquisition unit 50 and the azimuth acquisition unit 51 at the time when the specified shooting target is determined to be not included in the latest live view image data (step S311: No) (information indicating the position and the azimuth of the imaging device 2A at the time point of determination (the current time point)). Furthermore, the first display control unit 272A grasps, based on the position information and the azimuth direction included in the specification information and the position information and the azimuth information of the imaging device 2A currently acquired, the direction or the position where the specified shooting target O is present, where the position and the azimuth of the imaging device 2A at the current time point are given as the reference. Then, as illustrated in (c) and (d) of FIG. 10, the imaging device 2A displays, for a predetermined period of time, the superimposed images S3 and S4 that are obtained by superimposing, on the latest live view images W101 and W102, the guide information G indicating the direction or the position where the specified shooting target O is present.

On the other hand, if it is determined that the specified shooting target is included in the latest live view image data (in the example of FIG. 10, the live view image W103) (step S311: Yes), the imaging control unit 275A performs shooting (step S313).

Specifically, in step S313, the imaging control unit 275A performs shooting by a mechanical shutter by driving the shutter drive unit 41 and the image sensor drive unit 43. Also, the image processing unit 46 performs basic image processing or special image processing on image data that is generated by the image sensor 42 by shooting by the mechanical shutter and stored in the SDRAM 56.

Subsequently, the imaging control unit 275A causes the image compression/decompression unit 49 to compress the image data generated by the shooting in step S313 (the image data which has been generated by shooting by the mechanical shutter and subjected to basic image processing or special image processing), and records the compressed image data to the recording medium 54 (step S314). Then, the imaging device 2A returns to step S301.

If it is determined in step S310 that the imaging device 2A is set to the manual shooting mode (step S310: No), the determination unit 274A determines, as in step S311, whether or not the specified shooting target is included in the latest live view image data stored in the SDRAM 56, based on the specification information recorded in the recording medium 54 (step S315).

If it is determined that the specified shooting target is not included in the latest live view image data (step S315: No), the first display control unit 272A causes, as in step S312, the first display unit 22A to display, for a predetermined period of time, a superimposed image that is obtained by superimposing, on the live view image corresponding to the latest live view image data that is stored in the SDRAM 56, guide information indicating the direction or the position where the specified shooting target is present (in the example of FIG. 11, superimposed images S3 and S4 that are obtained by superimposing guide information G on the live view images W101 and W102) (step S316). Then, the imaging device 2A proceeds to step S318.

On the other hand, if it is determined that the specified shooting target is included in the latest live view image data (step S315: Yes), the first display control unit 272A causes the first display unit 22A to display, for a predetermined period of time, a superimposed image that is obtained by superimposing identification information for identifying the specified shooting target on the live view image corresponding to the latest live view image data (in the example of FIG. 11, a superimposed image S1 that is obtained by superimposing identification information I on the live view image W103) (step S317), as in step S112 described in the first embodiment above. Then the imaging device 2A proceeds to step S318.

After step S316 or S317, or if it is determined in step S309 that there is no specification information which is not used in recording of image data (step S309: No), the first control unit 27A determines whether or not there is a shooting operation by the user of the imaging device 2A (whether or not there is input of a second release signal from the release switch 232) (step S318).

If it is determined that there is no shooting operation (step S318: No), the imaging device 2A returns to step S301.

On the other hand, if it is determined that there is a shooting operation (step S318: Yes), the imaging control unit 275A performs shooting (step S319) as in steps S313 and S314, and also, records image data in the recording medium 54 (step S320). Then, the imaging device 2A returns to step S301.

If it is determined in step S302 that the imaging device 2A is not set to the shooting mode (step S302: No), the first control unit 27A determines whether or not the imaging device 2A is set to the playback mode by operation of the mode switching switch 233 by the user of the imaging device 2A (step S321).

If it is determined that the imaging device 2A is not set to the playback mode (step S321: No), the imaging device 2A returns to step S301.

On the other hand, if it is determined that the imaging device 2A is set to the playback mode (step S321: Yes), the first display control unit 272A causes the first display unit 22A to display an image corresponding to the image data that is recorded in the recording medium 54 (step S322).

Subsequently, the first display control unit 272A determines whether or not an instruction signal to change the image is input by operation of the first input unit 23A or the touch panel 53 by the user of the imaging device 2A (step S323).

If it is determined that an instruction signal to change the image is input (step S323: Yes), the first display control unit 272A changes the image which is to be displayed by the first display unit 22A (step S324). Then, the imaging device 2A returns to step S322.

On the other hand, if it is determined that an instruction signal to change the image is not input (step S323: No), the imaging device 2A returns to step S301.

According to the second embodiment described above, the following effect may be achieved in addition to the same effect as that of the first embodiment described above.

The imaging device 2A according to the second embodiment includes the position acquisition unit 50 and the azimuth acquisition unit 51. Furthermore, the imaging device 2A generates, as the specification information, image data regarding a specified shooting target (subject image information) described in the first embodiment above and position information and azimuth information (information indicating the position and the like where the specified shooting target is present) acquired respectively by the position acquisition unit 50 and the azimuth acquisition unit 51 at the time point of reception of recording information. Of course, the subject image information in the specification information does not have to include all the pieces of information about a subject image, and so-called feature points, used at the time of measuring the similarity between images, which express a change in shading by coordinates, for example, or a target object image analysis result obtained from an image may be used instead. An analysis result may be, in the case where a person is the target object, the name, the sex or the age of an individual in the form of text- or sign-based information, or the clothing or the like stored in the form of color information. Those having bright colors and that are easily identified, such as a butterfly or a flower, may be substituted by color information, or may be size information, shape information, movement features, arrangement of joints in the form of information, or the like.

Thus, in the case where it is determined that a specified shooting target is not included in the latest live view image data, the imaging device 2A may display guide information indicating the direction or the position where the specified shooting target is present (in the examples of FIGS. 10 and 11, the guide information G), and urge the user of the imaging device 2A to move the position or to change the field of view.

Also, when recording information is received, the imaging device 2A according to the second embodiment displays information to that effect (in the examples of FIGS. 10 and 11, information R).

Accordingly, for example, in a situation where shooting should not be performed in consideration of the surrounding environment, the user of the imaging device 2A may check the information mentioned above, and change the setting of the imaging device 2A from the automatic shooting mode to the manual shooting mode or turn off the power to thereby preventing shooting to be automatically performed in the automatic shooting mode.

Example Modification of Second Embodiment

In the second embodiment described above, the main body 4 and the lens unit 5 are separately configured, but this is not restrictive, and the main body 4 and the lens unit 5 may also be integrally configured.

In the second embodiment described above, the guide information G indicating the direction in which a specified shooting target is present is cited as an example of guide information according to the present invention, but this is not restrictive, and guide information indicating the position (location) where a specified shooting target is present (for example, a message "specified shooting target is at a location ○○") may be used instead, for example.

In the second embodiment described above, the determination unit 274A determines whether or not a specified shooting target is included in live view image data by pattern matching or the like, but this is not restrictive. For example, it is possible to determine that a specified shooting target is included in live view image data, when the position and the azimuth of the imaging device 2A at the current time point match the position or the like where the specified shooting target is present according to the position information and the azimuth information (information indicating the position or the like where the specified shooting target is present) included in the specification information and the position information and the azimuth information acquired respectively by the position acquisition unit 50 and the azimuth acquisition unit 51 (information indicating the position and the azimuth of the imaging device 2A at the current time point) at the time of determination of whether or not the specified shooting target is included in the live view image data (at the current time point).

Third Embodiment

Next, a third embodiment of the present invention will be described.

In the following description, the structural elements and steps the same as those of the first embodiment described above will be denoted by the same reference signs, and detailed description thereof will be omitted, or the description will be simplified.

In the first embodiment described above, the imaging system 1 makes the user of the communication device 3 issue an operation instruction for pointing to a specified shooting target while checking an image that is live-view displayed by the communication device 3 (the same image as the image that is currently displayed by the imaging device 2).

On the other hand, an imaging system according to the third embodiment transmits a video file generated in advance by the imaging device to the communication device, and makes the user of the communication device issue an operation instruction for pointing to a specified shooting target while checking the image of the image file that is being played back and displayed by the communication device.

Configuration of Imaging System

Figure 12:
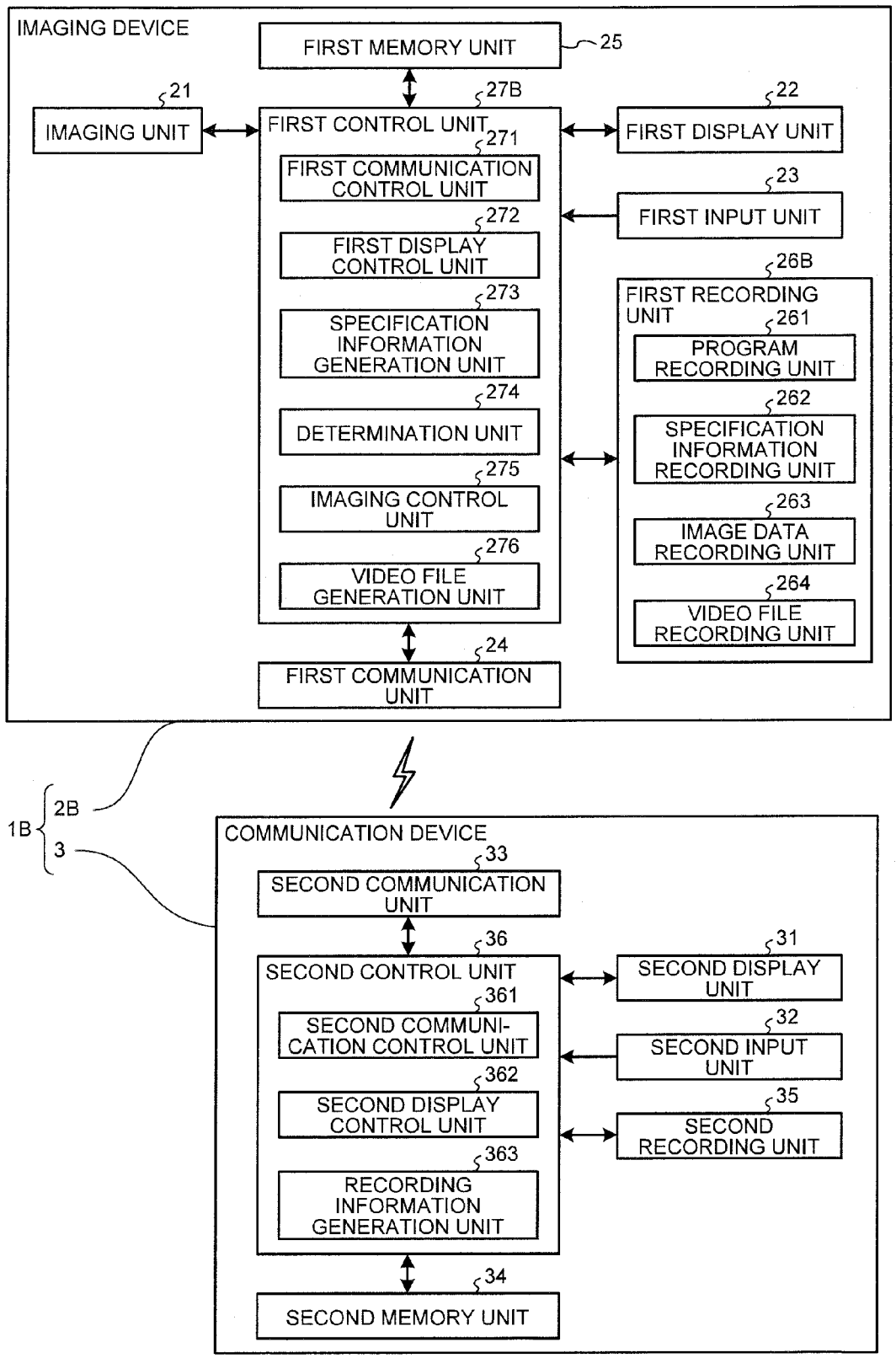
FIG. 12 is a block diagram illustrating a configuration of an imaging system according to a third embodiment of the present invention.

FIG. 12 is a block diagram illustrating the configuration of the imaging system according to the third embodiment.

As illustrated in FIG. 12, an imaging device 2B configuring an imaging system 1B has, with respect to the imaging device 2 described in the first embodiment (FIG. 1), a video file generation unit 276 added to a first control unit 27B, and a video file recording unit 264 added to a first recording unit 26B.

The video file generation unit 276 generates a video file in which pieces of image data generated by the imaging unit 21 are arranged in a chronological order.

The video file recording unit 264 records the video file generated by the video file generation unit 276.

Additionally, as illustrated in FIG. 12, a communication device 3 configuring the imaging system 1B is the same as the communication device 3 described in the first embodiment above (FIG. 1).

Operation of Imaging System

Next, the operation of the imaging system 1B according to the third embodiment will be described.

In the following, as the operation of the imaging system 1B, the operation of the imaging device 2B (an imaging method according to the present invention), and the operation of the communication device 3 will be described in this order.

Operation of Imaging Device

Figure 13:
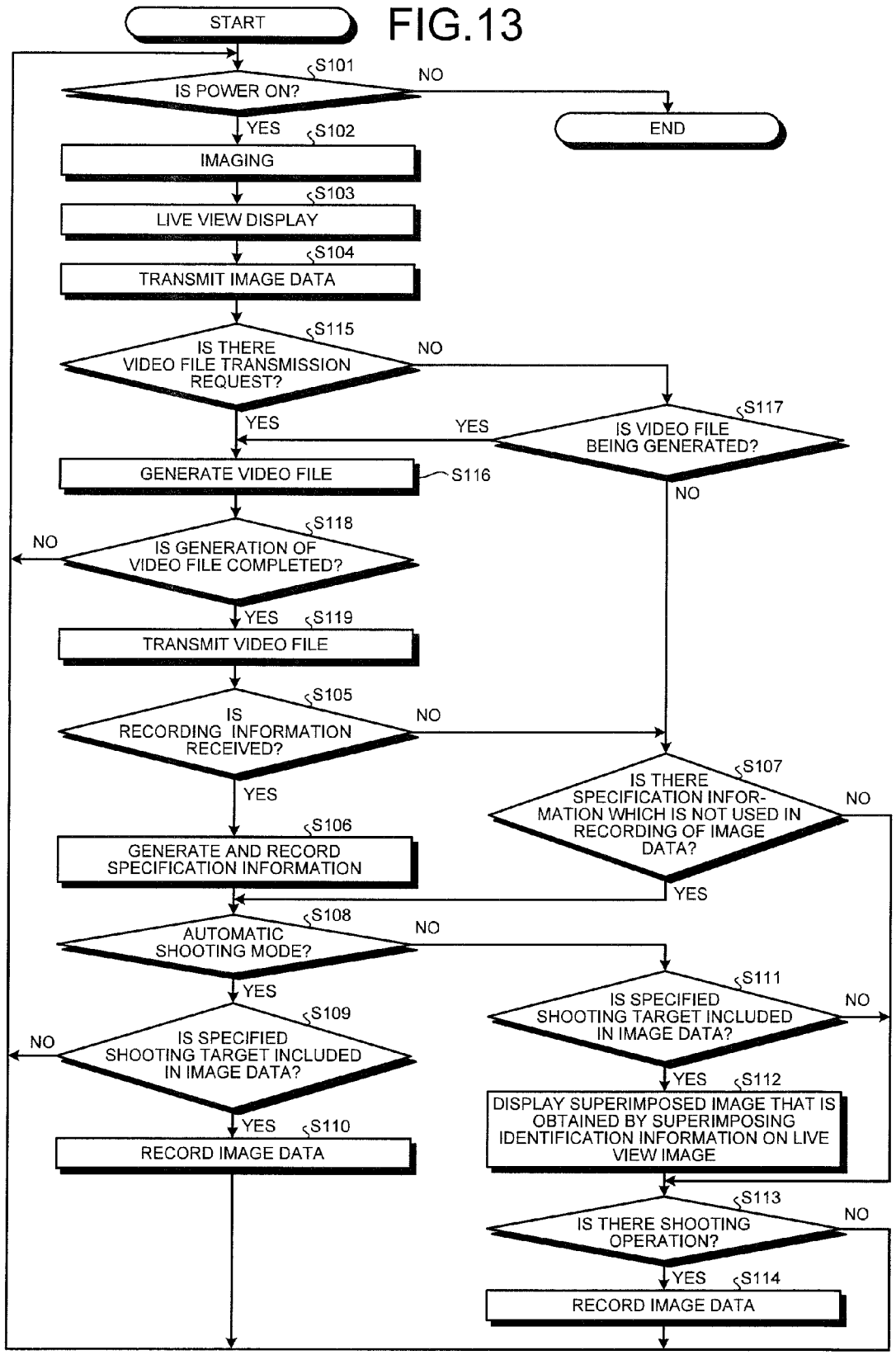
FIG. 13 is a flow chart illustrating an operation of the imaging device illustrated in FIG. 12.

FIG. 13 is a flow chart illustrating the operation of the imaging device 2B according to the third embodiment.

The operation of the imaging device 2B according to the third embodiment is different from the operation of the imaging device 2 described in the first embodiment above (FIG. 2) in that steps S115 to S119 are added, as illustrated in FIG. 13.

Accordingly, in the following, only the differences will be described.

After step S104, the first communication control unit 271 determines whether or not a video file transmission request is received from the communication device 3 via the first communication unit 24 (step S115).

If it is determined that a video file transmission request is not received (step S115: No), the imaging device 2B proceeds to step S117.

On the other hand, if it is determined that a video file transmission request is received (step S115: Yes), the video file generation unit 276 causes the video file recording unit 264 to sequentially record, as a video, in a generated video file, the latest live view image data stored in the first memory unit 25 (step S116).

Also, in step S117, the imaging device 2B determines whether a video file is being generated, and continues generation of the video file (step S116) in the case where "Yes" is determined, and proceeds to step S107 in the case where "No" is determined.

After step S116, the video file generation unit 276 determines whether or not generation of the video file is completed (whether image data of a predetermined number of frames is recorded as a video) (step S118).

If it is determined that generation of the video file is completed (step S118: Yes), the first communication control unit 271 transmits the video file that is recorded in the video file recording unit 264 to the communication device 3 via the first communication unit 24 (step S119).

On the other hand, if it is determined that generation of the video file is not completed (step S118: No), the imaging device 2B returns to step S101.

Operation of Communication Device

FIG. 14 is a flow chart illustrating the operation of the communication device 3 according to the third embodiment.

The operation of the communication device 3 according to the third embodiment is different from the operation of the communication device 3 described in the first embodiment above (FIG. 3) in that steps S207 to S212 are added, as illustrated in FIG. 14.

Accordingly, in the following, only the differences will be described.

In the state where the power of the communication device 3 is on (step S201: Yes), the second control unit 36 determines whether or not a video file is being played back (continuance of step S211 described later) (step S207).

If it is determined that a video file is being played back (step S207: Yes), the communication device 3 proceeds to step S211.

On the other hand, if it is determined that a video file is not being played back (step S207: No), the communication device 3 proceeds to step S202.

In the state where a live view image is being displayed in step S203, the second control unit 36 determines whether or not there is an operation instruction regarding a video file transmission request for the imaging device 2, based on an instruction signal, a position signal, or audio data from the second input unit 32 (step S208).

If it is determined that there is no operation instruction regarding a video file transmission request (step S208: No), the communication device 3 returns to step S201.

On the other hand, if it is determined that there is an operation instruction regarding a video file transmission request (step S208: Yes), the second communication control unit 361 issues a video file transmission request to the imaging device 2 via the second communication unit 33 (step S209).

Subsequently, the second communication control unit 361 determines whether or not a video file is received from the imaging device 2B via the second communication unit 33 (step S210).

If it is determined that a video file is not received (step S210: No), the communication device 3 returns to step S201.

On the other hand, if it is determined that a video file is received (step S210: Yes), the second control unit 36 stores the received video file in the second memory unit 34. Then, the second display control unit 362 causes the second display unit 31 to play back and display the video file (step S211).

Then, the recording information generation unit 363 determines whether or not there is an operation instruction for causing the imaging device 2B to record image data, based on an instruction signal, a position signal, or audio data from the second input unit 32 (step S212).

If it is determined that there is no operation instruction for causing the imaging device 2B to record image data (step S212: No), the communication device 3 returns to step S201.

On the other hand, if it is determined that there is an operation instruction for causing the imaging device 2B to record image data (step S212: Yes), the communication device 3 proceeds to step S205.

Additionally, in step S205 according to the third embodiment, a frame (image data) in a video file that is displayed at the time when it is determined that there is an operation instruction for causing the imaging device 2B to record image data (for example, a touch operation on the second input unit (touch panel) 32) (step S212: Yes) and information about a position touched by the user of the communication device 3 (see (f) of FIG. 5) are generated as the recording information.

According to the third embodiment described above, the following effect may be achieved in addition to the same effect as that of the first embodiment described above.

The imaging system 1B according to the third embodiment transmits a video file that is generated in advance by the imaging device 2B to the communication device 3, and makes the user of the communication device 3 issue an operation instruction for pointing to the specified shooting target while checking the image in the video file that is played back and displayed by the communication device 3.

Accordingly, since the target of the operation instruction is a video file, it is possible to repeatedly play back and display the video file, and a specified shooting target may be easily determined.

Example Modification of Third Embodiment

In the third embodiment described above, it is also possible to add the position acquisition unit 50 and the azimuth acquisition unit 51 described in the second embodiment above to the configuration of the imaging device 2B. When adopting such a configuration, at the time of generation of a video file, position information and azimuth information acquired by the position acquisition unit 50 and the azimuth acquisition unit 51 at the time point of generation of image data are preferably recorded in the video file recording unit 264 in association with each frame of the image data. If such information is recorded, guide information as described in the second embodiment above indicating the direction or the position where a specified shooting target is present may be displayed.

Other Embodiments

Heretofore, modes for carrying out the present invention have been described, but the present invention is not limited to the first to the third embodiments described above.

According to the first to third embodiments above, the imaging devices 2, 2A, and 2B determine, based on specification information, whether or not a specified shooting target is included in live view image data, and if it is determined that a specified shooting target is included, perform display for encouraging automatic shooting or a shooting operation, but this is not restrictive, and the following configuration may alternatively be adopted, for example.

That is, the imaging device displays specification information that is recorded in the recording unit (image data regarding a specified shooting target, or information indicating the position or the like where a specified shooting target is present (position information and azimuth information)), and makes the user of the imaging device recognize the same. Then, the user of the imaging device looks for the specified shooting target based on the recognized information, and performs a shooting operation.

According to the first to the third embodiments described above, a person image is cited as an example of the specified shooting target, but this is not restrictive, and the specified shooting target includes animal, plant, or landscape such as a mountain.

According to the first to the third embodiments described above, recording information including live view image data corresponding to a live view image that is displayed at the time point of issuance of an operation instruction (a touch operation (see (f) of FIG. 5) and information regarding the touched position is cited as an example of recording information according to the present invention, but this is not restrictive.

For example, it is also possible to use, as the recording information, only the live view image data corresponding to a live view image that is displayed at the time point of issuance of an operation instruction (including not only the touch operation, but also operation of a button, a switch or the like, an operation based on utterance of words such as "shoot now", or the like). At this time, when the recording information (live view image data) is received, the imaging device analyzes the live view image data, and specifies every structure (a person image, background such as a mountain, etc.) included in the live view image, and generates, as the specification information, each of pieces of image data regarding all the structures which have been specified.

According to the first to the third embodiments described above, identification information I which is a balloon pointing to the specified shooting target, in which a message is written, is cited as an example of identification information according to the present invention, but this is not restrictive. For example, so long as the specified shooting target may be identified, it is possible to adopt a configuration of adding (superimposing) identification information which is a thick frame or the like to the outline portion of an image corresponding to the specified shooting target.

According to the first to the third embodiments described above, the first display units 22 and 22A, and the first display control units 272 and 272A are adopted as an announcement unit according to the present invention, but this is not restrictive, and a speaker or the like may be separately provided, and predetermined information may be announced by audio from the speaker.

Also, the processing flows are not restricted to the orders of processing in the flow charts described in the first to the third embodiments described above, and may be changed as long as no inconsistencies are caused.

Furthermore, in the present specification, the algorithms of the processes described with reference to the flow charts may be written as programs. Such programs may be recorded in a recording unit inside a computer, or may be recorded in a computer-readable recording medium. Recording of a program in a recording unit or a recording medium may be performed at the time of shipping of the computer or the recording medium as goods, or may be performed by downloading via a communication network.

An imaging device according to some embodiments generates, when recording information is received from an external communication device, specification information for specifying a subject image desired by the user of the communication device, based on the recording information. Then, the imaging device records the specification information in a recording unit.

Thus, the user of the imaging device may grasp the subject desired by the user of the communication device based on the specification information recorded in the recording unit, for example, and perform a shooting operation for the subject on the imaging device. That is, the user of the imaging device may take the current situation into account, and perform shooting of the subject desired by the user of the communication device at a later time instead of at the current time point.

Therefore, according to the imaging device of some embodiments, it is possible to increase the convenience.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device that images a subject, the imaging device comprising:
    an imaging unit that successively images the subject to generate a plurality of image data;
    a first communication unit that connects to an external communication device to transmit and receive information to and from the communication device;
    a first communication control unit that transmits at least some of the plurality of image data to the communication device and receives recording information for causing the imaging device to record a subject image included in one of the plurality of image data from the communication device, via the first communication unit, wherein the recording information includes information extracted or derived from pixels of the one of the plurality of image data; and
    a specification information generation unit that generates specification information for specifying the subject image based on the recording information received via the first communication unit and records the specification information in a recording unit, wherein the specification information includes at least one of (A) text-based information from an analysis result of the subject, (B) sign-based information from an analysis result of the subject, (C) outline information from an analysis result of the subject, and (D) shape information from an analysis result of the subject.

2. The imaging device according to claim 1, further comprising:
    a determination unit that determines whether the subject image is included in another one of the plurality of image data based on the specification information recorded in the recording unit; and
    an announcement unit that announces, when the determination unit determines that the subject image is included in the other one of the plurality of image data, information indicating that the subject image is included in the image data.

3. The imaging device according to claim 2, wherein the announcement unit includes:
    a first display unit; and
    a first display control unit that causes the first display unit to display an image corresponding to the other one of the plurality of image data and causes the first display unit to display a superimposed image obtained by superimposing identification information for identifying the subject image on the image corresponding to the other one of the plurality of image data when the determination unit determines that the subject image is included in the other one of the plurality of image data.

4. The imaging device according to claim 1, further comprising:
    a determination unit that determines whether the subject image is included in another one of the plurality of image data based on the specification information recorded in the recording unit; and
    an imaging control unit that records, when the determination unit determines that the subject image is included in the other one of the plurality of image data, the other one of the plurality of image data in the recording unit.

5. The imaging device according to claim 1, further comprising:
    a position acquisition unit that acquires position information related to a position of the imaging device; and
    an azimuth acquisition unit that acquires azimuth information related to an azimuth of the imaging device, wherein
    the specification information generation unit records, in the recording unit, the specification information including the position information and the azimuth information respectively acquired by the position acquisition unit and the azimuth acquisition unit upon receipt of the recording information via the first communication unit.

6. The imaging device according to claim 5, further comprising:
    a determination unit that determines whether the subject image is included in another one of the plurality of image data based on the specification information recorded in the recording unit; and
    an announcement unit that announces, when the determination unit determines that the subject image is not included in the other one of the plurality of image data, a direction or a position where the subject image is present, based on the specification information recorded in the recording unit, the position information and the azimuth information respectively acquired by the position acquisition unit and the azimuth acquisition unit at the time when the determination unit determines that the subject image is not included in the other one of the plurality of image data.

7. The imaging device according to claim 6, wherein the announcement unit includes:
a first display unit; and
a first display control unit that, when the determination unit determines that the subject image is not included in the other one of the plurality of image data, causes the first display unit to display the specification information recorded in the recording unit and guide information indicating the direction or the position where the subject image is present.

8. The imaging device according to claim 1, further comprising a video file generation unit that generates a video file in which pieces of image data generated by the imaging unit are arranged in a chronological order, wherein
the first communication control unit transmits the video file to the communication device and receives, from the communication device, the recording information for causing the imaging device to record the subject image included in the other one of the plurality of image data in the video file, via the first communication unit.

9. The imaging device according to claim 1, further comprising an announcement unit that announces, when the recording information is received, information indicating that the recording information is received.

10. An imaging system comprising:
the imaging device according to claim 1; and
the communication device that connects to the imaging device to transmit and receive information to and from the imaging device,
the communication device includes:
a second communication unit that connects to the imaging device to transmit and receive information to and from the imaging device;
a second communication control unit that receives the image data from the imaging device via the second communication unit;
a second display unit;
a second display control unit that causes the second display unit to display an image corresponding to the image data received via the second communication unit;
an instruction receiving unit that receives an operation instruction; and
an recording information generation unit that generates the recording information for causing the imaging device to record the subject image included in the image data based on the operation instruction received by the instruction receiving unit, wherein
the second communication control unit transmits the recording information to the imaging device.

11. The imaging device of claim 1 further comprising:
a determination unit for determining whether or not an image includes the specified shooting target based on a correlation or match amount between data of the image and the specification information that had been recorded in the recording unit.

12. An imaging method executed by an imaging device, the imaging method comprising:
successively imaging a subject to generate a plurality of image data;
transmitting at least some of the plurality of image data to an external communication device; and
when recording information for causing the imaging device to record a subject image included in one of the plurality of image data is received from the communication device, generating specification information for specifying the subject image based on the recording information and recording the specification information in a recording unit, wherein
the recording information includes information extracted or derived from pixels of the one of the plurality of image data, and
wherein the specification information includes at least one of (A) text-based information from an analysis result of the subject, (B) sign-based information from an analysis result of the subject, (C) outline information from an analysis result of the subject, and (D) shape information from an analysis result of the subject.

13. The imaging method of claim 12 further comprising:
determining whether or not an image includes the specified shooting target based on a correlation or match amount between data of the image and the specification information that had been recorded.

14. A non-transitory computer readable recording medium having an executable program recorded thereon, the program instructing a processor included in an imaging device, to execute:
successively imaging a subject to generate a plurality of image data;
transmitting at least some of the plurality of image data to an external communication device; and
when recording information for causing the imaging device to record a subject image included in one of the plurality of image data is received from the communication device, generating specification information for specifying the subject image based on the recording information and recording the specification information in a recording unit, wherein
the recording information includes information extracted or derived from pixels of the one of the plurality of image data, and
wherein the specification information includes at least one of (A) text-based information from an analysis result of the subject, (B) sign-based information from an analysis result of the subject, (C) outline information from an analysis result of the subject, and (D) shape information from an analysis result of the subject t.

15. The non-transitory computer readable recording medium of claim 14 further comprising:
determining whether or not an image includes the specified shooting target based on a correlation or match amount between data of the image and the specification.

* * * * *